(12) United States Patent
Setterberg et al.

(10) Patent No.: US 11,794,611 B2
(45) Date of Patent: Oct. 24, 2023

(54) KINEMATIC VEHICLE SEAT

(71) Applicant: Volvo Car Corporation, Gothenburg (SE)

(72) Inventors: Peter Setterberg, Partille (SE); Lars Modh, Uddevalla (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/654,178

(22) Filed: Mar. 9, 2022

(65) Prior Publication Data
US 2022/0194266 A1    Jun. 23, 2022

Related U.S. Application Data

(63) Continuation of application No. 16/918,402, filed on Jul. 1, 2020, now Pat. No. 11,299,069.

(51) Int. Cl.
*B60N 2/02*    (2006.01)
*B60N 2/12*    (2006.01)
(Continued)

(52) U.S. Cl.
CPC ......... *B60N 2/0232* (2013.01); *B60N 2/067* (2013.01); *B60N 2/0722* (2013.01); *B60N 2/12* (2013.01);
(Continued)

(58) Field of Classification Search
CPC ......... B60N 2/12; B60N 2/3065; B60N 2/206
See application file for complete search history.

(56) References Cited

U.S. PATENT DOCUMENTS 5,575,533 A * 11/1996 Glance .................... B60R 22/20
297/452.2
6,428,102 B1    8/2002 Becker et al.
(Continued)

FOREIGN PATENT DOCUMENTS

DE    202009006984 U1 *  8/2009 .............. B60N 2/12
DE    10 2014 223 405 A1    6/2016
(Continued)

OTHER PUBLICATIONS

Non-Final Office Action received for U.S. Appl. No. 16/918,458 dated Dec. 20, 2021, 16 pages.
(Continued)

*Primary Examiner* — Milton Nelson, Jr.
(74) *Attorney, Agent, or Firm* — Amin, Turocy & Watson, LLP

(57) ABSTRACT

A vehicle seat comprises: a seat base; a first side member is affixed to a base at a first side of the base; a second side member is affixed to the base at a second side of the base, opposite the first side of the base; a slider slidably received in the base; a seat back assembly is rotatably coupled to the first side member and rotatably coupled to the second side member; a linkage rotatably coupled to the seat back assembly and rotatably coupled to the slider; a first lower seat lifting mechanism comprising a lifting bracket, wherein the lifting bracket is rotatably coupled to the first side member at a first end of the lifting bracket; and a second lower seat lifting mechanism comprising a bracket rotatably coupled to the base and a link arm rotatably coupled to the bracket and rotatably coupled to the slider.

20 Claims, 27 Drawing Sheets

(51) Int. Cl.
  *B60N 2/06* (2006.01)
  *B60N 2/16* (2006.01)
  *B60N 2/54* (2006.01)
  *B60N 2/07* (2006.01)

(52) U.S. Cl.
  CPC .......... *B60N 2/164* (2013.01); *B60N 2/1625* (2013.01); *B60N 2/54* (2013.01); *B60N 2002/024* (2013.01)

(56) References Cited

U.S. PATENT DOCUMENTS

| | | |
|---|---|---|
| 7,775,592 B2 | 8/2010 | Becker et al. |
| 9,796,310 B1 | 10/2017 | Line et al. |
| 10,399,465 B2 | 9/2019 | Nakamura et al. |
| 2006/0001306 A1 | 1/2006 | Becker et al. |
| 2019/0092191 A1 | 3/2019 | Bouzid et al. |
| 2020/0101872 A1 | 4/2020 | Epaud et al. |

FOREIGN PATENT DOCUMENTS

| | | | | |
|---|---|---|---|---|
| DE | 10 2010 036 346 B4 | 7/2020 | | |
| EP | 628445 A1 | * 12/1994 | ........... | B60N 2/0292 |
| EP | 2184202 A1 | * 5/2010 | ............. | B60N 2/206 |
| EP | 2 537 704 A1 | 12/2012 | | |
| WO | 2007/016530 A2 | 2/2007 | | |

OTHER PUBLICATIONS

Non-Final Office Action received for U.S. Appl. No. 16/918,402 dated Sep. 1, 2021, 69 pages.

\* cited by examiner

FIG. 5

KINEMATIC VEHICLE SEAT

CROSS REFERENCE TO RELATED APPLICATIONS

This application is a continuation of, and claims priority to, pending U.S. patent application Ser. No. 16/918,402, filed on Jul. 1, 2020, entitled "KINEMATIC VEHICLE SEAT". The entirety of the aforementioned application is hereby incorporated herein by reference.

TECHNICAL FIELD

The present description generally relates to vehicle seats having kinematic folding mechanisms. A vehicle seat can comprise a submarining section to enable optimized folding, for example. The present description also relates to methods for manufacturing kinematic seats.

BACKGROUND

Sport Utility Vehicles (SUVs) and crossovers, also referred to as crossover utility vehicles (CUVs), are becoming increasingly popular over smaller, compact, cars. One of the many benefits of these larger vehicles is the ability to transport more people. For example, some SUVs or CUVs can often safely accommodate seven or even eight passengers. While the ability to move a large quantity of people is important to many, often equally important is the ability to convert a vehicle interior from a "people mover" to a "cargo hauler". Doing so typically requires removal or stowing of second and/or third-row vehicle seats. A vehicle's overall utility is impacted by how effectively and efficiently second or third-row seats fold and store. Third row seats, for example, should be substantial enough to comfortably accommodate children and adults, while also able to collapse or stow away to maximize cargo capacity.

Existing third-row seats, for example, are often cumbersome and inefficient in that they don't make optimal use of available space. For instance, conventional third row seats often possess a hinged seat back that merely folds the seat back atop a seat bottom without stowing the seat bottom. Such seat bottoms are often floor-mounted or sacrifice valuable space beneath the seat bottom. Other seats have whole-seat tumbling mechanisms, but these are expensive to implement, complex, and do not necessarily maximize space. Some other folding seats have collapsible seat bottoms, but such seats are hinged only at the rear of the seat bottom, meaning that only the front of the seat raises and lowers while the rear hinges. In this regard, the height of the rear of the seat bottom is fixed, which can create an uncomfortable seating position for occupants when the seat is in a seating position. Additional conventional seats have sliding lower cushions which slide back and forth in response to rotational motion of a seat back. This can leave gaps and unnecessarily compress seat cushions. Thus, there exists a need for vehicle seats with an improved folding design.

The above-described background relating to vehicle seats is merely intended to provide a contextual overview of some current issues and is not intended to be exhaustive. Other contextual information may become further apparent upon review of the following detailed description.

SUMMARY

The following summary is a general overview of various embodiments disclosed herein and is not intended to be exhaustive of limiting upon the disclosed embodiments. Embodiments are better understood upon consideration of the detailed description below in conjunction with the accompanying drawings and claims.

It is an object of the present description to provide for an improved vehicle seat having an improved folding or stowing features.

In one embodiment, a kinematic seat for a vehicle is described herein. The kinematic seat comprises a seat base connected to the vehicle, a first side member affixed to a base at a first side of the base, a second side member affixed to the base at a second side of the base, opposite the first side of the base, a slider slidably received in the base, a seat back assembly, wherein the seat back assembly is rotatably coupled to the first side member and rotatably coupled to the second side member, a linkage rotatably coupled to the seat back assembly and rotatably coupled to the slider, whereby sliding of the slider rotates the seat back assembly, a first lower seat lifting mechanism comprising a lifting bracket, wherein the lifting bracket is rotatably coupled to the first side member at a first end of the lifting bracket, and wherein the lifting bracket is slidably received in a channel of the first side member at a second end of the lifting bracket, and a second lower seat lifting mechanism, wherein the second lower seat lifting mechanism comprises a bracket rotatably coupled to the base and a link arm rotatably coupled to the bracket and rotatably coupled to the slider.

In another embodiment, a vehicle seat is described herein. The vehicle seat comprises a seat base fixed to a vehicle, the seat base comprising a pair of parallel lower seat rails, a first side member fixed to a first lower seat rail of the pair of parallel lower seat rails, a second side member fixed to a second lower seat rail of the pair of parallel lower seat rails, a first upper seat rail, slidably coupled to the first lower seat rail, a second upper seat rail, slidably coupled to the second lower seat rail, a seat back assembly, rotatably coupled to the first side member at a first side of the seat back assembly and rotatably coupled to the second side member at a second side of the seat back assembly, a first linkage rotatably coupled to the seat back assembly and rotatably coupled to the first upper seat rail, a second linkage rotatably coupled to the seat back assembly and rotatably coupled to the second upper seat rail, a first lower seat lifting assembly, rotatably coupled to the first side member and rotatably coupled to the second side member, configured to concurrently adjust a height of a first side of a lower seat with an angular position of the seat back assembly, and a second seat lifting assembly configured to concurrently adjust a height of a second side of the lower seat, opposite the first side of the lower seat, with the angular position of the seat back assembly, whereby the second side of the lower seat moves in a substantially vertical direction.

In a further embodiment, a method for making a collapsible seat is described herein. The method comprises slidably coupling a first upper seat rail to a first lower seat rail, slidably coupling a second upper seat rail to a second lower seat rail, attaching a first side member to the first lower seat rail, attaching a second side member to the second lower seat rail, pivotally attaching a seat back to the first side member and to the second side member, pivotally attaching a first linkage to the seat back and to the first upper seat rail, pivotally attaching a second linkage to the seat back and to the second upper seat rail, pivotally attaching a seat lifting assembly to the first side member and to the second side member, pivotally attaching a first submarine bracket to the first lower seat rail, pivotally attaching a second submarine bracket to the second lower seat rail, pivotally attaching a first linkage to the first submarine bracket and to the first upper seat rail, pivotally attaching a second linkage to the second submarine bracket and to the second upper seat rail, and attaching a submarine tube to the first submarine bracket and to the second submarine bracket.

DESCRIPTION OF DRAWINGS

Various non-limiting embodiments of the subject disclosure are described with reference to the following figures, wherein like reference numerals refer to like parts throughout unless otherwise specified.

FIG. 5 shows exemplary components of a kinematic vehicle seat in accordance with one or more embodiments described herein.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

For uniformity of description, vehicle seats are presumed to be conventionally forward-facing with respect to a vehicle to which they are attached, though embodiments herein do not require such seats to necessarily be forward-facing. As used herein, the Z-axis corresponds to a height direction of a vehicle, the X-axis corresponds to a length direction of a vehicle, and a Y-axis corresponds to a width direction of a vehicle. For example, when the term "up" or "upper" is used to indicate a position or direction, it is intended to mean towards the roof of a vehicle during normal use of the vehicle. Additionally, the term "forward" is used to indicate a relatively frontal position or direction with respect to a vehicle. Likewise, "rear" is used to indicate a relatively rearward position or direction with respect to a vehicle.

Figure 1:
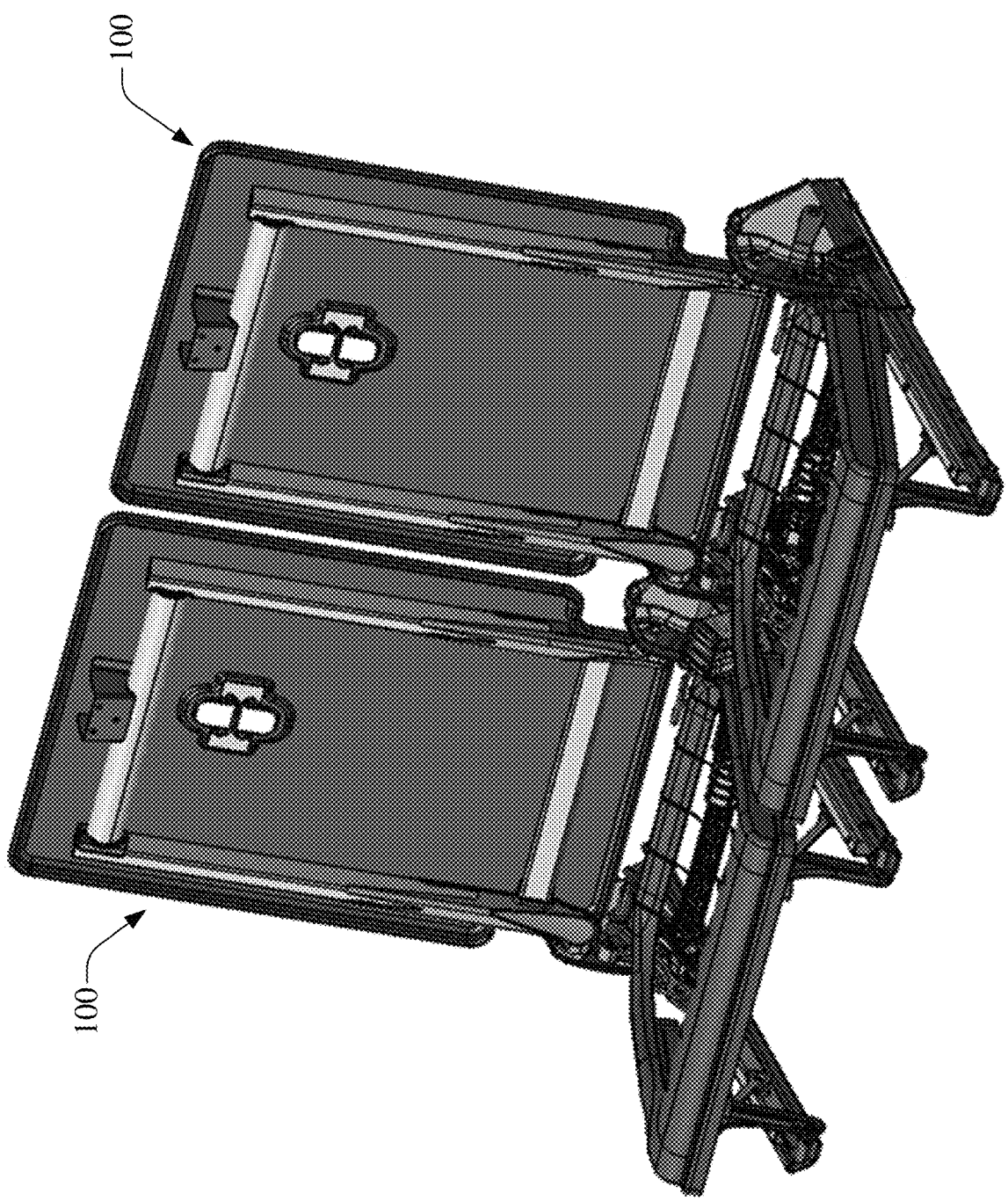
FIG. 1 shows an exemplary implementation of a pair of kinematic vehicle seats in accordance with one or more embodiments described herein.

With reference to FIG. 1, there is illustrated an exemplary pair of vehicle seats (two of vehicle seat 100). It can be appreciated that each vehicle seat 100 of the pair of vehicle seats are independently operated, though other embodiments can comprise a pair of vehicle seats as an integrated assembly. The vehicle seat 100 can be received in a vehicle (e.g., SUV, CUV, sedan, coupe, convertible, pickup truck, etc.). According to an embodiment, the vehicle seat 100 is configured to be received in a third-row of a vehicle, though the vehicle seat can also be installed in a second-row or first-row of a vehicle.

FIGS. 2-10 illustrate a "buildup" of an exemplary, non-limiting vehicle seat 100 from a single perspective view. In this regard, the vehicle seat 100 is illustrated in various states of construction/deconstruction in order to illustrate its plurality of components and subcomponents. Therefore, it should be appreciated that some components or subcomponents may not be visible in some drawings, but this does not preclude inclusion of such omitted components or subcomponents since such an omission may only be for visualization purposes.

Figure 2:
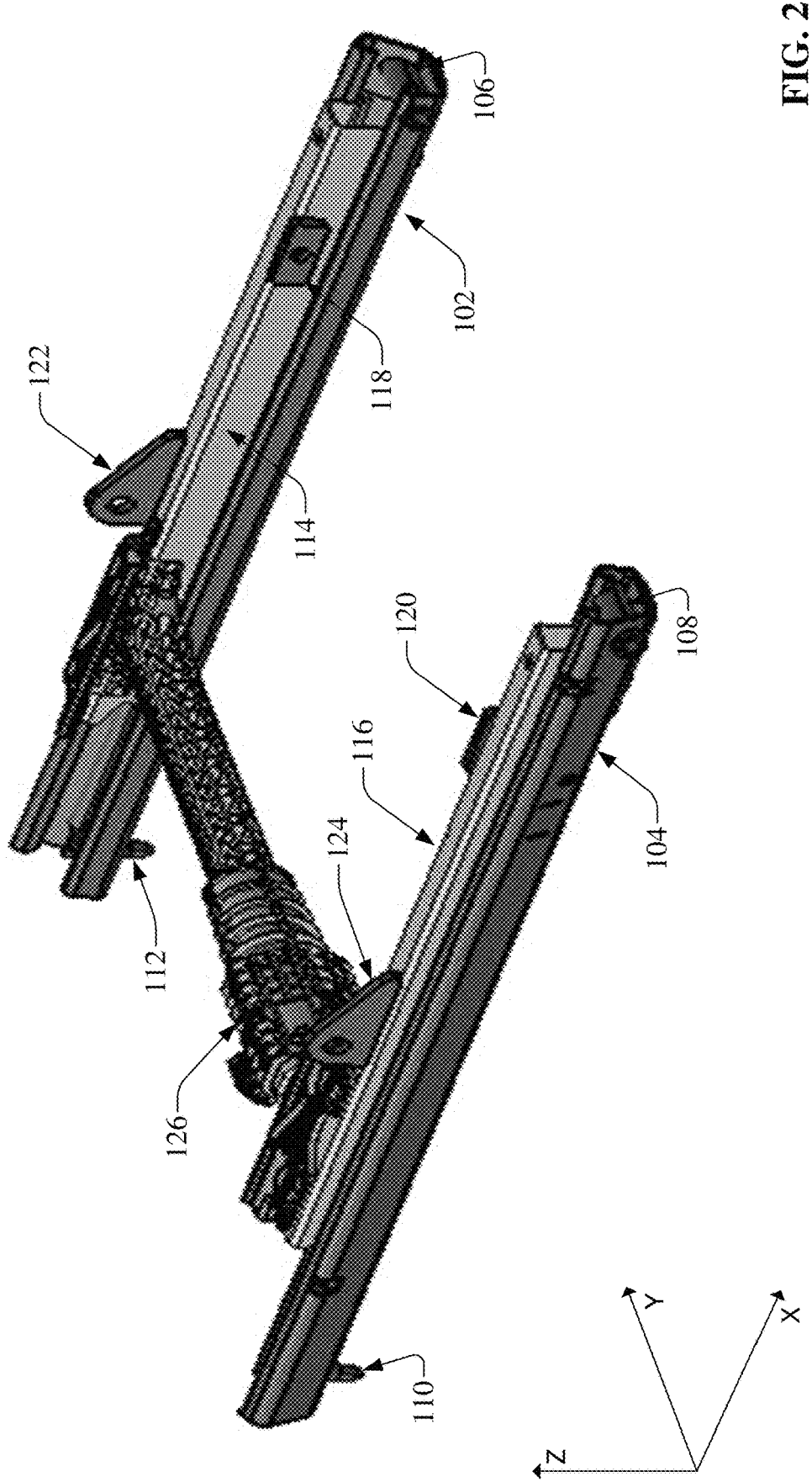
FIG. 2 shows exemplary components of a kinematic vehicle seat in accordance with one or more embodiments described herein.

Turning now to FIG. 2, there is illustrated a lower rail 102 and a lower rail 104 (collectively the "lower rails" or "pair parallel of lower rails"). The lower rails can alternatively be referred to as a base. As depicted, the lower rails can be substantially parallel and coplanar, though other embodiments can comprise lower rails that are not coplanar. For instance, lower rail 102 and lower rail 104 can be located at different heights along the Z-axis to accommodate, for example, a floor structure of a vehicle to which the vehicle seat 100 is attached.

The lower rails can comprise geometry applicable for installation in a vehicle (e.g., a Volvo® XC90). For instance, various holes or slots can be provided in the lower rails to facilitate assembly to a vehicle. Though preferably bolted to a vehicle, the lower rails can alternatively be riveted, welded, or otherwise secure to a vehicle as would be understood by one skilled in the art. Alternatively, lower rails can be manufactured as part of a vehicle floor pan or structure.

The lowers rails can comprise steel, aluminum, or other materials suitable for safely securing a vehicle seat 100 to a vehicle. Such other materials can comprise various alloys, plastics, etc.

Either of the lower rails can comprise a track on which an upper rail 114 or an upper rail 116 (collectively the "upper rails" or "upper seat rails") can be slidably attached. In this regard, the lower rails and upper rails can comprise corresponding geometric features such that the upper rails can slide along the X-axis without appreciable movement in the Z or Y-axis. The upper rails can alternatively be referred to as sliders (or a slider with reference to a single upper rail). The upper rails can be configured to support the weight of seat bottom assembly, which can comprise forward or rear lifting mechanisms. The upper rails can comprise steel, aluminum, or other materials suitable for attachment to the lower rails. Such other materials can comprise various alloys, plastics, etc.

A rail stop 106 or rail stop 108 be located at an end of a lower rail 102 or lower rail 104 which can provide a physical barrier to stop sliding of an upper rail 114 or upper rail 116 at an end of the lower rails (e.g., forward end or rear end of the lower rails). Though depicted at only one end of the lower rails, either of a lower rail 102 or a lower rail 104 can comprise a second rail stop, thus preventing an upper rail 114 or an upper rail 116 from extending beyond the geometric limits of either end of either lower rail.

Rail mounting stud 110 or rail mounting stud 112 (collectively the "rail mounting studs") can be fixed on a side (e.g., bottom side) of a lower rail 104 or lower rail 102. The rail mounting studs can be, for example, welded, secured with fasteners, stamped, riveted, formed, forged, or otherwise attached to a lower rail 102 or lower rail 104 as would be understood by one skilled in the art. The rail mounting studs can be utilized to attach the lower rails to a vehicle (e.g., floor pan, vehicle structure, vehicle substructure, etc.). It can be appreciated that a vehicle seat 100 can comprise a plurality of rail mounting studs, located anywhere suitable on the lower rails, for safe and secure mounting of the lower rails. The rail mounting studs can be threaded to receive a nut or otherwise configured to enable attachment to a vehicle.

Either of the upper rails can comprise a front link mount 118 or a front link mount 120 (collectively the "front link mounts"). According to an embodiment, the front link mount 118 can be fixed to a side of the upper rail 114. Likewise, the front link mount 120 can be fixed to a side of the upper rail 116. The front link mount 118 can be, for example, welded, secured with fasteners, stamped, riveted, formed, forged, or otherwise attached to the upper rail 114. The front link mount 120 can be similarly attached to the upper rail 116. The front link mount 118 or front link mount 120 can comprise a mounting point for a link arm (e.g., submarine link arm 166 or submarine link arm 168, respectively, which will be further discussed in greater detail below). A mounting point of the front link mount 118 or front link mount 120 can comprise a stud, mounting post, hole, threaded hole, etc., as would be required to have rotatably attached thereto a bracket, arm, link, etc.

Other embodiments can comprise upper rails that do not have separate front link mounts, and instead have upper rails that comprise therein a stud, mounting post, hole, threaded hole, etc., as would be required to have rotatably attached thereto a bracket, arm, link, etc. Such embodiments can comprise a reinforced (e.g., thicker) section of a respective upper rail for increased rigidity and strength.

Either of the upper rails can further comprise a pullback mount 122 or a pullback mount 124 (collectively the "pullback mounts"). According to an embodiment, the pullback mount 122 can be fixed to a side (e.g., top side) of the upper rail 114. Likewise, the pullback mount 124 can be fixed to a side of the upper rail 116. The pullback mount 122 or pullback mount 124 can comprise a mounting point for a link arm (e.g., pullback arm 156 or pullback arm 158, respectively, which will be further discussed in greater detail below). A mounting point of the pullback mount 122 or pullback mount 124 can comprise a stud, mounting post, rivet hole, threaded hole, etc., as would be required to have rotatably attached thereto a bracket, arm, link, etc.

Other embodiments can comprise upper rails that do not have separate pullback mounts, and instead have upper rails that comprise therein a stud, mounting post, hole, threaded hole, etc., as would be required to have rotatably attached thereto a bracket, arm, link, etc. Such embodiments can comprise a reinforced (e.g., thicker) section of a respective upper rail for increased rigidity and strength.

Slide actuator 126 can be coupled to an upper rail 114 or upper rail 116 (or to both, as depicted herein). The slide actuator 126 can comprise an electric motor for electromechanically sliding the upper rails relative to the lower rails. According to an embodiment, a rack and pinion configuration can be utilized in order to translate rotational motion output by the slide actuator 126 into linear motion of the upper rails, relative to the lower rails. In this regard, a lower rail 102 or lower rail 104 (or both) could comprise a rack, thus enabling a pinion of the slide actuator 126 to move the upper rails relative to the lower rails along the X-axis. Other configurations such as ball screw, roller pinion, etc. can be utilized in order to propel the upper rails relative to the lower rails by the slide actuator 126.

It can be an object of the slide actuator 126 to synchronize movement of the upper rails relative to each other (e.g., upper rail 114 moves same distance at, at same rate, at same time as upper rail 116).

Slide actuator 126 need not comprise an electric motor. Other embodiments can comprise pneumatic actuators or other types of actuators. Further embodiments are not power-assisted, and instead utilize manual operation by, for example, a user of the vehicle seat 100. In this regard, the upper rails can be slidably engaged or disengaged with the lower rails by, for example, a pin or other mechanism for enabling/disabling motion as would be understood by one skilled in the art. Manual actuation can be operated, for instance, by a lever or latch operated by a user of the vehicle seat 100.

Figure 3:
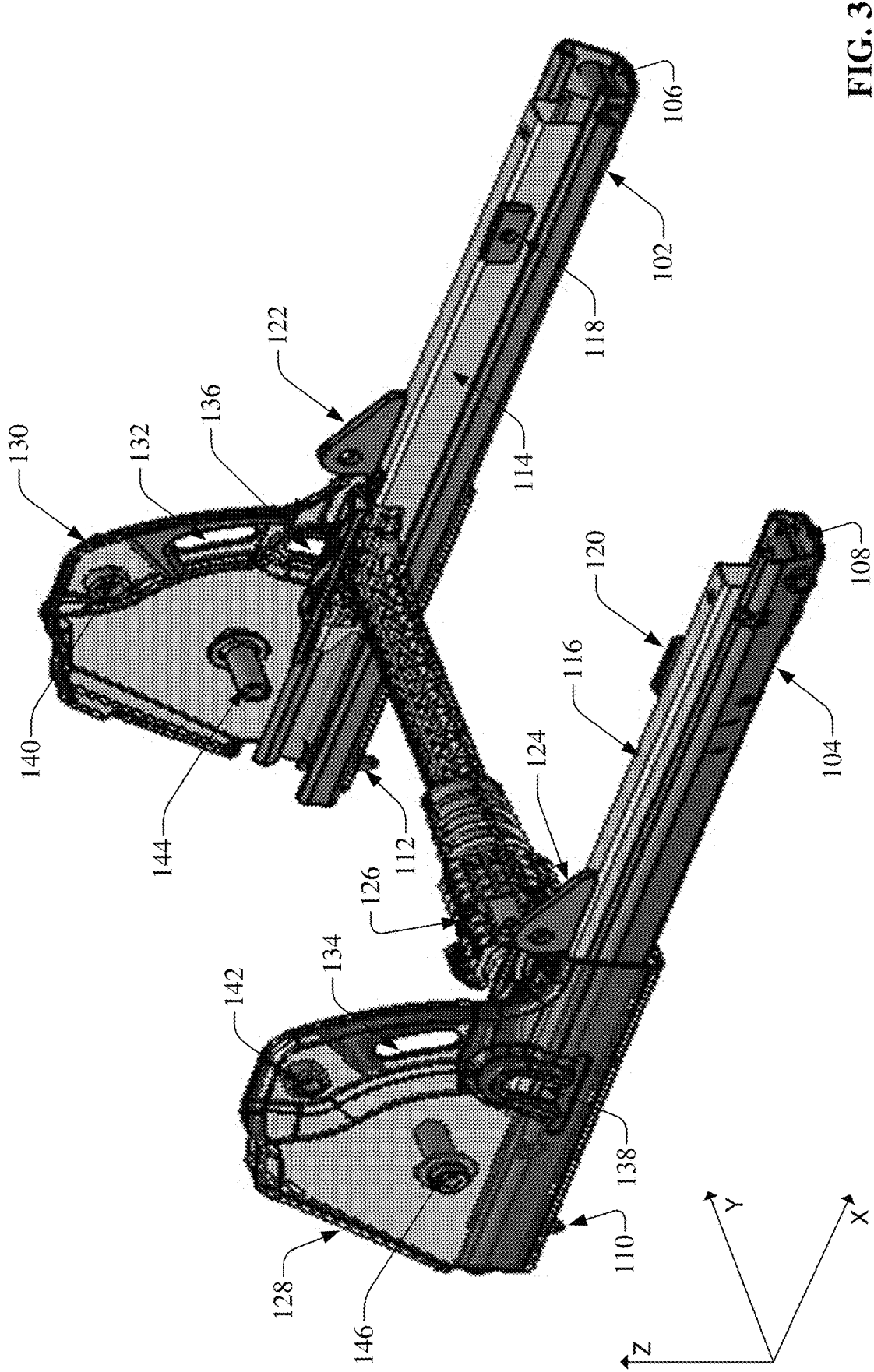
FIG. 3 shows exemplary components of a kinematic vehicle seat in accordance with one or more embodiments described herein.

Turning now to FIG. 3, there is illustrated a side member 128 coupled to the lower rail 104. Additionally, a side member 130 is coupled to the lower rail 102. The side member 128 can be, for example, welded, secured with fasteners, stamped, riveted, formed, forged, or otherwise attached to the lower rail 104. The side member 130 can be similarly attached to the lower rail 102.

The side member 128 can comprise an upper channel 134 located near an edge of the side member 128. The side member 128 can further comprise a lower channel 138 substantially beneath the upper channel 134. Likewise, side member 130 can comprise an upper channel 132 located near an edge of the side member 130. The side member 130 can further comprise a lower channel 136 substantially beneath the upper channel 132.

The side member 128 can further comprise a seat back mount 142 and a lifting mechanism mount 146. Likewise, the side member 130 can comprise a seat back mount 140 and a lifting mechanism mount 144.

The seat back mount 140 or seat back mount 142 can be utilized to rotatably attach a seat back (e.g., seat back 148) to the side member 130 or side member 128, respectively, and preferably to both. The seat back mount 140 or seat back mount 142 can comprise a stud, mounting post, hole, threaded hole, etc., as would be required to have rotatably attached thereto a seat back (e.g., seat back 148).

The lifting mechanism mount 144 or lifting mechanism mount 146 can be utilized to rotatably attach a lifting mechanism (e.g., lifting mechanism assembly 173) to the side member 130 or side member 128, respectively. The lifting mechanism mount 144 or lifting mechanism mount 146 can comprise a stud, mounting post, hole, threaded hole, etc., as would be required to have rotatably attached thereto a lifting mechanism (e.g., lifting mechanism assembly 173).

The side member 128 or side member 130 can comprise steel, aluminum, or other materials suitable for safely securing a vehicle seat back (e.g., seat back 148), lifting mechanism assembly 173, or other components to the lower rails or otherwise to a vehicle. Such other materials can comprise various alloys, plastics, etc.

Figure 4:
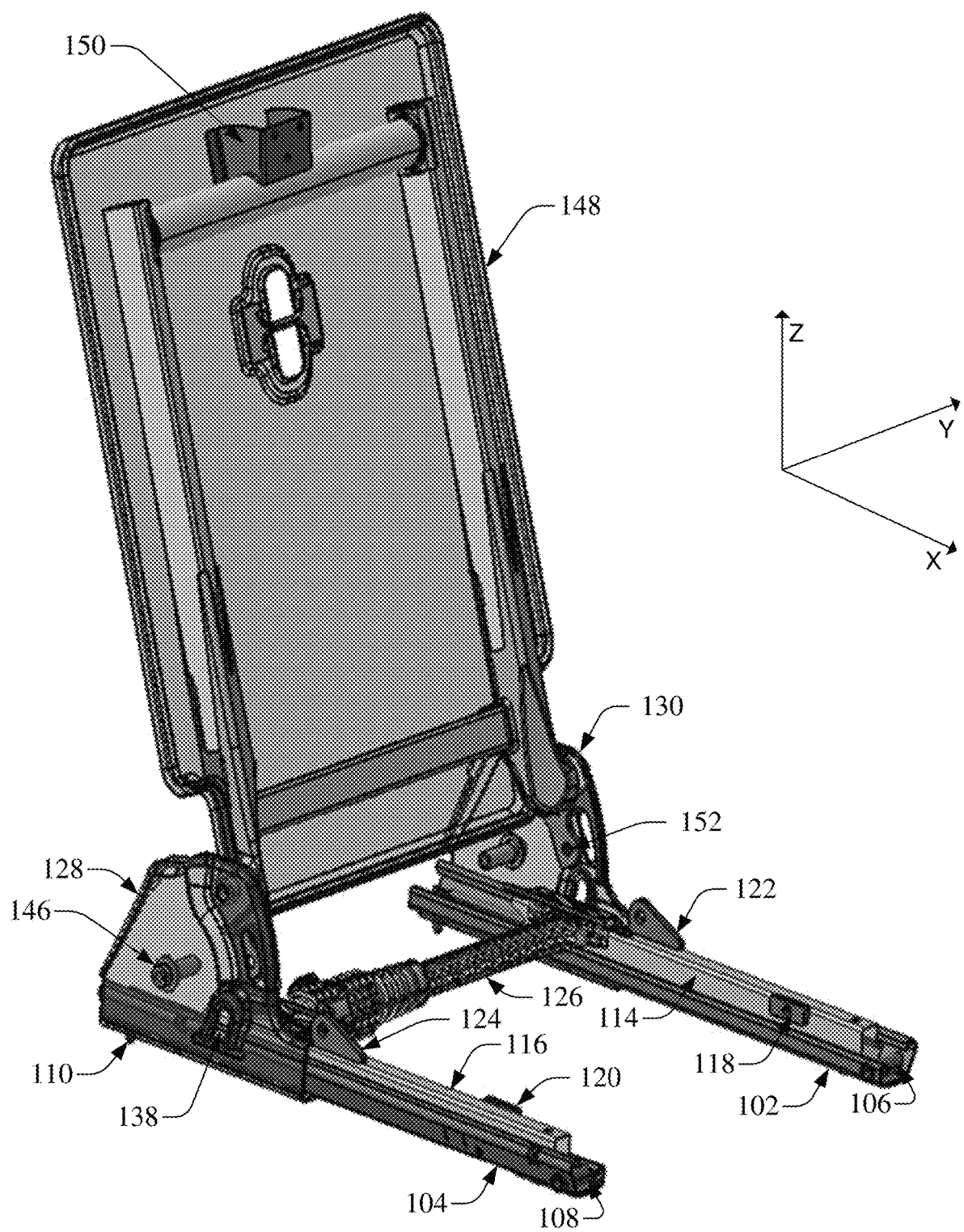
FIG. 4 shows exemplary components of a kinematic vehicle seat in accordance with one or more embodiments described herein.

Turning now to FIG. 4, a seat back 148 comprising a seat back upper bracket 150 is depicted. The seat back 148 can be rotatably attached to the side member 128 and side member 130 via the seat back mount 142 and seat back mount 140.

The seat back upper bracket 150 can enable attachment of an upper seat cushion 180, a headrest, or otherwise further enable assembly of the vehicle seat 100.

The seat back 148 can comprise a seat back pullback mount 152 and a seat back pullback mount 154 (collectively the "seat back pullback mounts"). The seat back pullback mounts can comprise a stud, mounting post, hole, threaded hole, etc., as would be required to have rotatably attached thereto a link, arm, bracket, etc. (e.g., pullback arm 156 or pullback arm 158 as later depicted and described).

Figure 5:
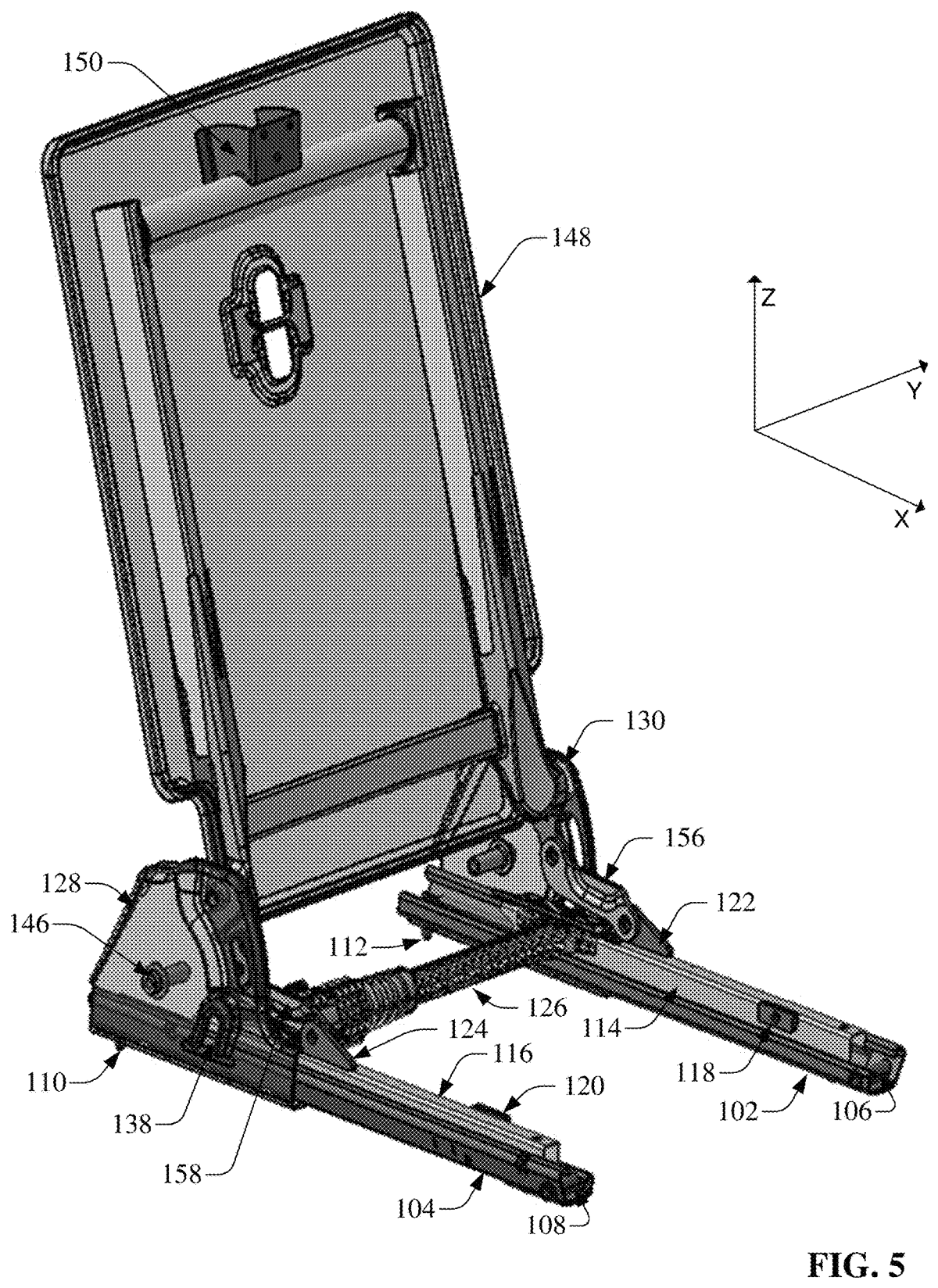

As illustrated in FIG. 5, a pullback arm 156 can be rotatably attached to the seat back pullback mount 152. The pullback arm 156 can also be rotatably attached to the pullback mount 122. Likewise, a pullback arm 158 can be rotatably attached to both of a seat back pullback mount 154 and pullback mount 124. The pullback arm 156 or pullback arm 158 (collectively the "pullback arms") can be bolted, riveted, or otherwise rotatably attached the pullback mount 122, pullback mount 124, seat back pullback mount 152, or seat back pullback mount 154. Pullback arms can alternatively be referred to as a singular linkage or plural linkages.

The pullback arms can translate the linear movement of the upper rails (along the X-axis) into rotational movement of the seat back 148. In this regard, sliding of the upper rails can cause the seat back 148 to concurrently rotate about the seat back mount 140 and seat back mount 142.

The pullback arms can comprise steel, aluminum, or other suitable materials. Such other materials can comprise various alloys, plastics, etc.

Figure 6:
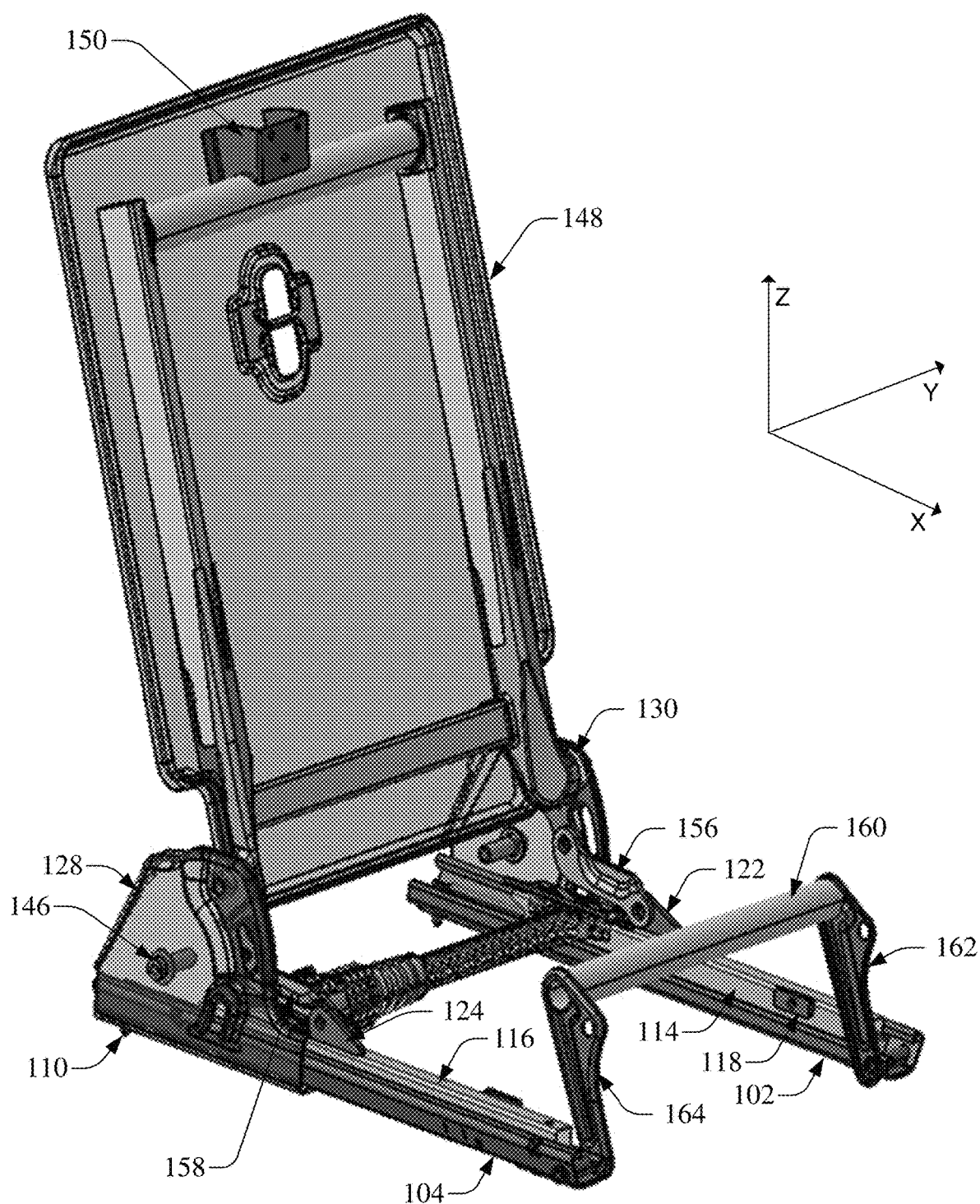
FIG. 6 shows exemplary components of a kinematic vehicle seat in accordance with one or more embodiments described herein.

Turning now to FIG. 6, there is additionally illustrated a submarine tube 160 (e.g., connecting rod or connecting tube), a submarine bracket 162 (e.g., mounting bracket), and a submarine bracket 164 (e.g., mounting bracket). The submarine bracket 162 can be rotatably attached to the lower rail 102. According to an embodiment, the submarine bracket 162 can be attached to the lower rail 102 as fastened through the rail stop 106. In this regard, the rail stop 106 can comprise a hole which can receive a bolt, rivet, screw, etc. to mount the submarine bracket 162. Likewise, the submarine bracket 164 can be rotatably attached to the lower rail 104. According to an embodiment, the submarine bracket 164 can be attached to the lower rail 104 as fastened through the rail stop 108. In this regard, the rail stop 108 can comprise a hole which can receive a bolt, rivet, screw, etc. to mount the submarine bracket 164.

The submarine bracket 162 or submarine bracket 164 can comprise steel, aluminum, or other suitable materials. Such other materials can comprise various alloys, plastics, etc.

The submarine tube 160 can be coupled to the submarine bracket 162 and the submarine bracket 164. According to one embodiment, the submarine tube 160 is rotatably attached to the submarine bracket 162 and the submarine bracket 164. According to another embodiment, the submarine tube 160 is non-rotatably fixed to the submarine bracket 162 and the submarine bracket 164, thus preventing rotation of the submarine tube 160 relative to the submarine bracket 162 or submarine bracket 164.

Figure 7:
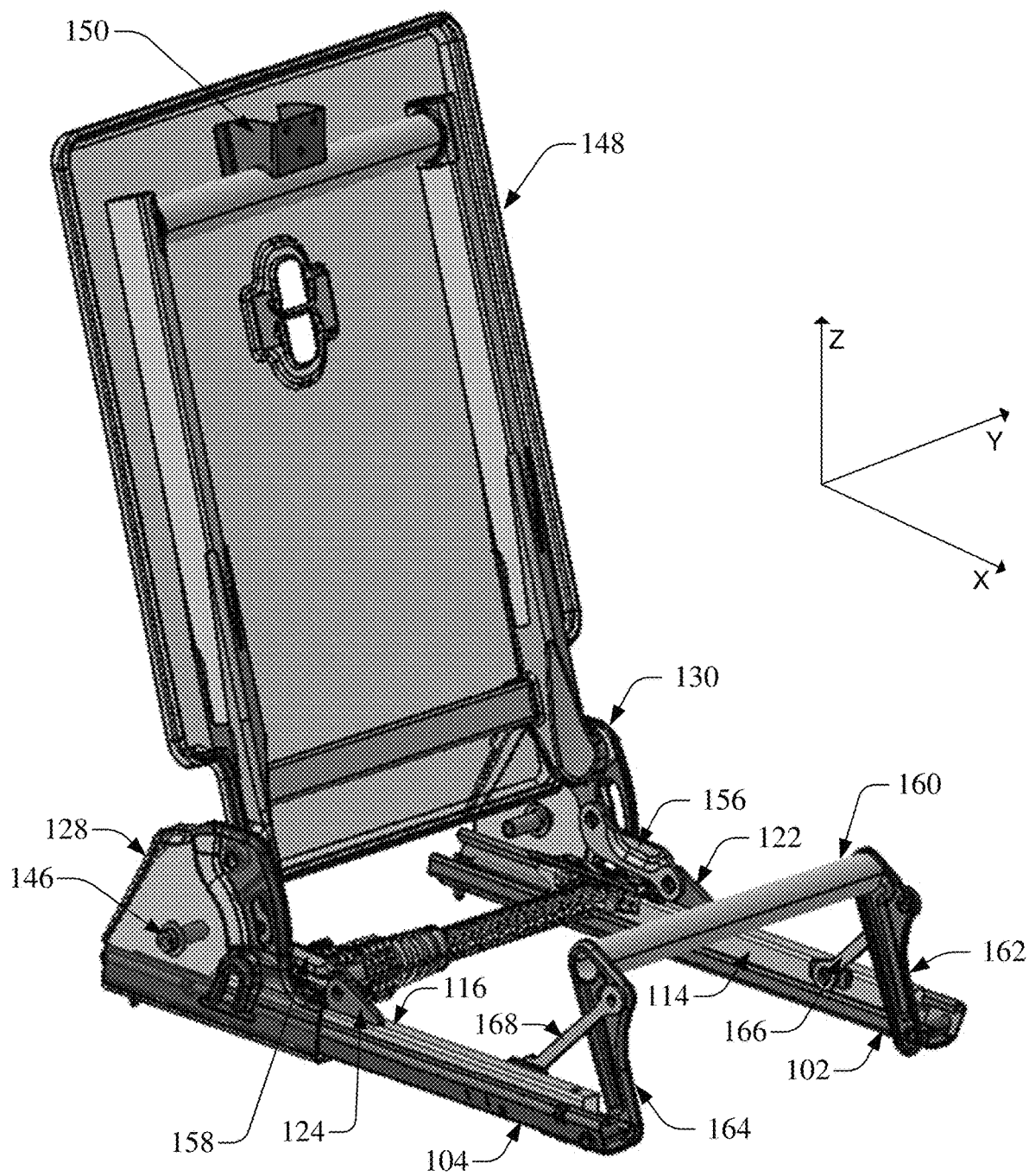
FIG. 7 shows exemplary components of a kinematic vehicle seat in accordance with one or more embodiments described herein.

With reference to FIG. 7, submarine link arm 166 and submarine link arm 168 are illustrated. According to an embodiment, the submarine link arm 166 is rotatably coupled at one end to the submarine bracket 162 and rotatably coupled at another end, opposite the one end, to the front link mount 118. Likewise, the submarine link arm 168 is rotatably coupled at one end to the submarine bracket 164 and rotatably coupled at another end, opposite the one end, to the front link mount 120. In this regard, Z-axis height of the submarine tube 160 changes concurrently with an X-axis positional change of the upper rails. For instance, when the upper rails slide along the X-axis toward the rear of the vehicle seat 100, the submarine tube 160 lowers along the Z-axis. Additionally, the seat back 148 concurrently rotates into a folded position when the upper rails slide along the X-axis toward the rear of the vehicle seat 100. This way, a single actuation (e.g., by slide actuator 126), can both lower the submarine tube 160 and fold down the seat back 148 by moving the upper rails, and can likewise raise both lower the submarine tube 160 and unfold the seat back 148 into a seating position by moving the upper rails.

The submarine link arm 166 or submarine link arm 168 can comprise steel, aluminum, or other suitable materials. Such other materials can comprise various alloys, plastics, etc.

Collectively, the submarine tube 160, submarine bracket 162, submarine bracket 164, submarine link arm 166, and submarine link arm 168 can be referred to as a front lifting assembly, a lower seat lifting mechanism, a seat lifting assembly, or a seat height adjustment mechanism. This front lifting assembly can provide crash safety and structural rigidity for the vehicle seat 100. Components of the front lifting assembly can comprise steel, aluminum, or other suitable materials. Such other materials can comprise various alloys, plastics, etc.

Figure 8:
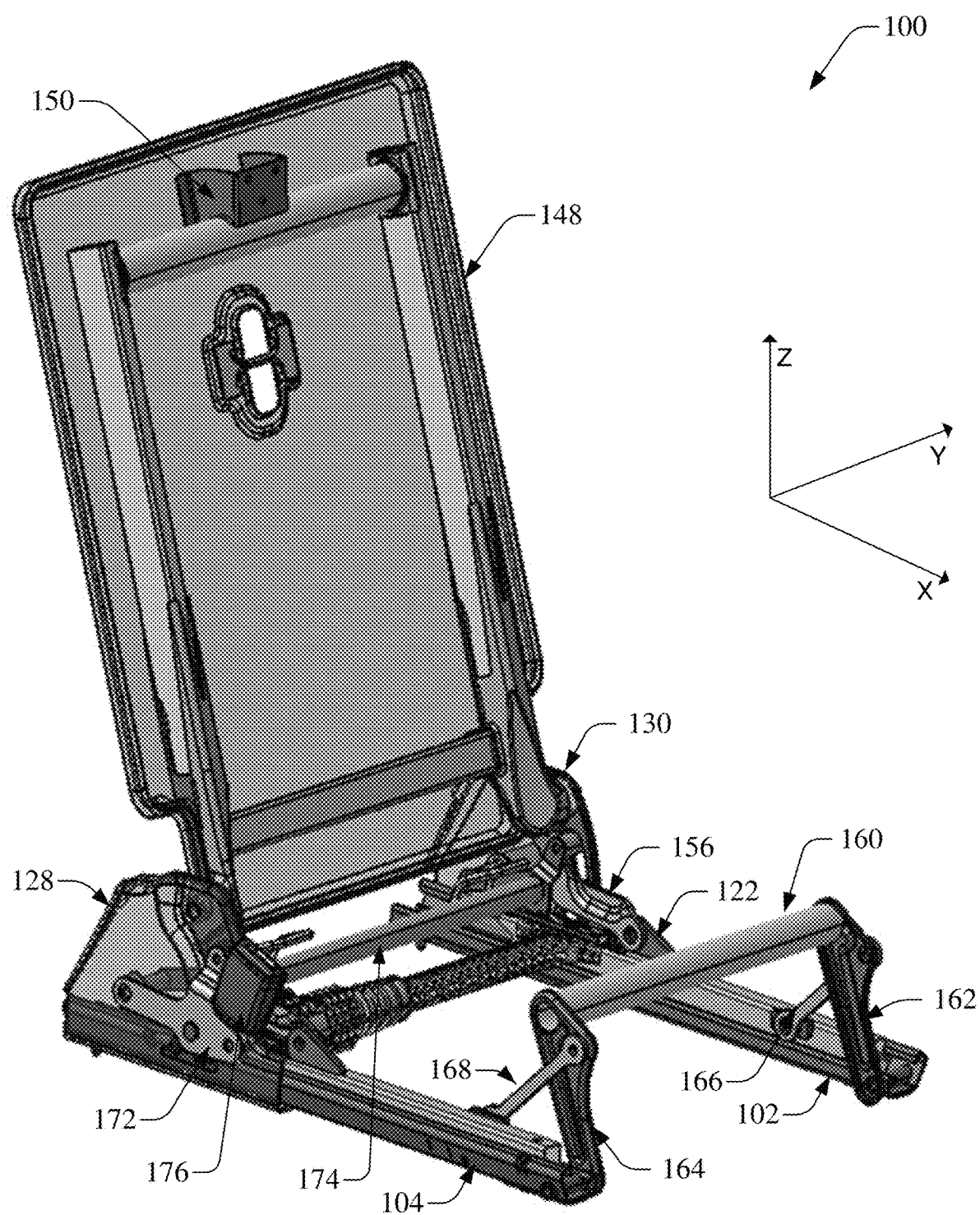
FIG. 8 shows exemplary components of a kinematic vehicle seat in accordance with one or more embodiments described herein.

FIG. 8 additionally depicts a lifting mechanism assembly 173. The lifting mechanism assembly 173 can alternatively be referred to as a lower seat lifting mechanism or a seat lifting assembly. The lifting mechanism assembly 173, which will be later described in greater detail, comprises an outer lifting arm 170 (e.g., outer arm), outer lifting arm 172 (e.g., outer arm), a lifting mechanism connecting tube 174 (e.g., connecting tube or crossmember), an inner lifting arm 175 (e.g., inner arm), and an inner lifting arm 177 (e.g., inner arm). A seat belt buckle assembly can be rotatably attached to the outer lifting arm 170, the outer lifting arm 172, or to a different component of the lifting mechanism 173 or vehicle seat 100. Components of the lifting mechanism assembly 173 can comprise steel, aluminum, or other suitable materials. Such other materials can comprise various alloys, plastics, etc.

Figure 9:
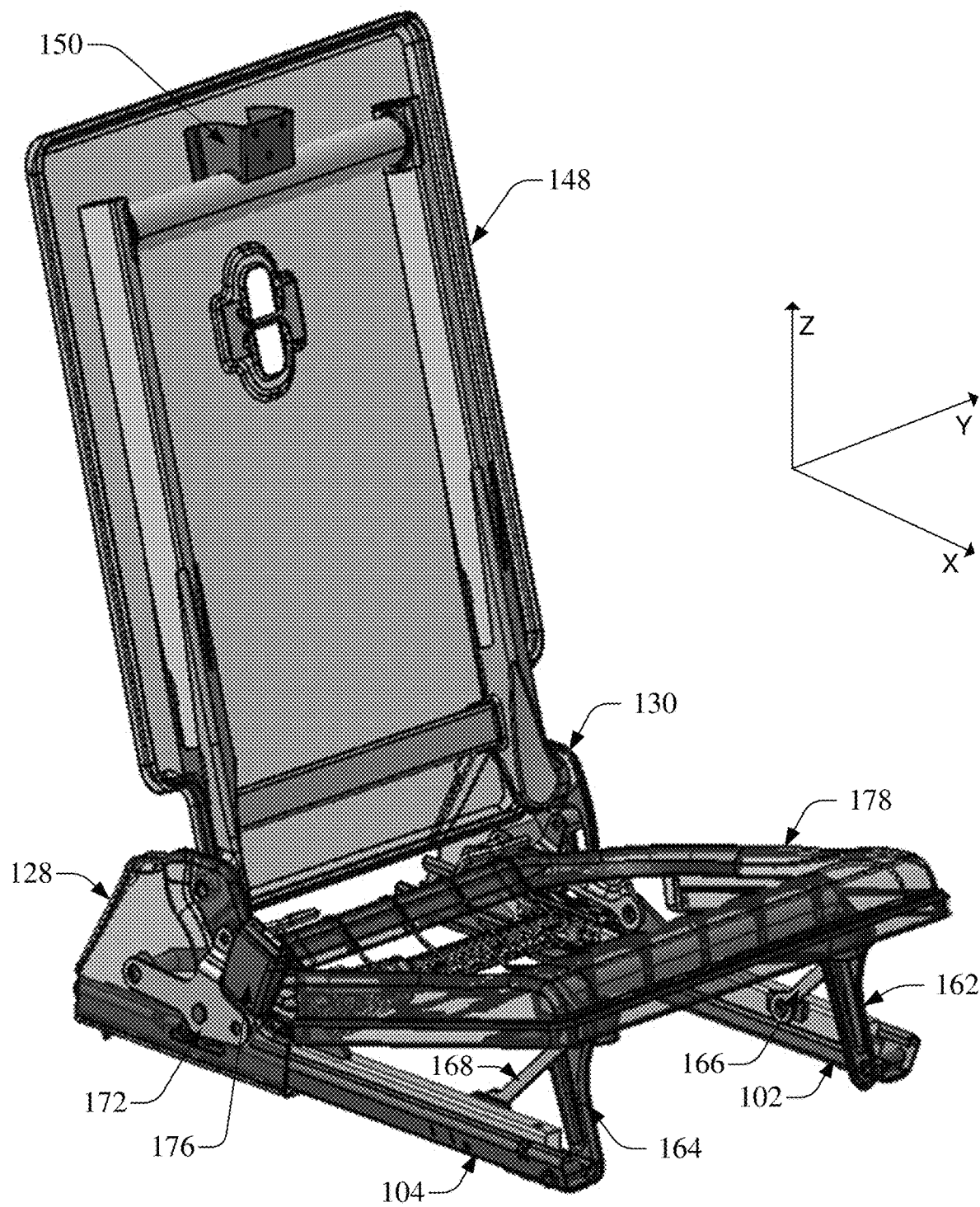
FIG. 9 shows exemplary components of a kinematic vehicle seat in accordance with one or more embodiments described herein.

FIG. 9 includes the seat pan 178. The seat pan 178 can comprise a plurality of seat springs 188. The plurality of seat springs (collectively a "spring mat") can be fixed to the seat pan 178 and, can rest on the submarine tube 160. The spring mat can be additionally rotatably attached to the lifting mechanism connecting tube 174. The springs 188 can be tensioned, for example, between the lifting mechanism assembly 173 and the seat pan 178. the According to an example, the seat springs 188 are shaped to conform to the exterior surface of the lifting mechanism connecting tube 174, such that linear motion of the spring mat relative to the lifting mechanism assembly 173 is prevented and only rotational movement about the lifting mechanism connecting tube 174 is enabled. It can be appreciated that a height of the seat pan 178 can change concurrently with the submarine tube 160 or lifting mechanism connecting tube 174.

The seat pan 178 can be manufactured from plastic, sheet metal, or other materials that can support a seat cushion and vehicle seat occupant.

It can be further appreciated that the submarine tube 160 can move along the X-axis relative to the spring mat. This is because the submarine tube 160 experiences some small positional change along the X-axis or Y-axis during a height change along the Z-axis, for instance, when the vehicle seat 100 is folded or unfolded. The above described configuration enables the submarine tube 160 to roll or slide against the spring mat during folding or unfolding of the vehicle seat 100. In this regard, the seat pan 178 is enabled to move in a substantially vertical direction with respect to the Z-axis, with no movement along the Y-axis and little movement along the X-axis.

Figure 10:
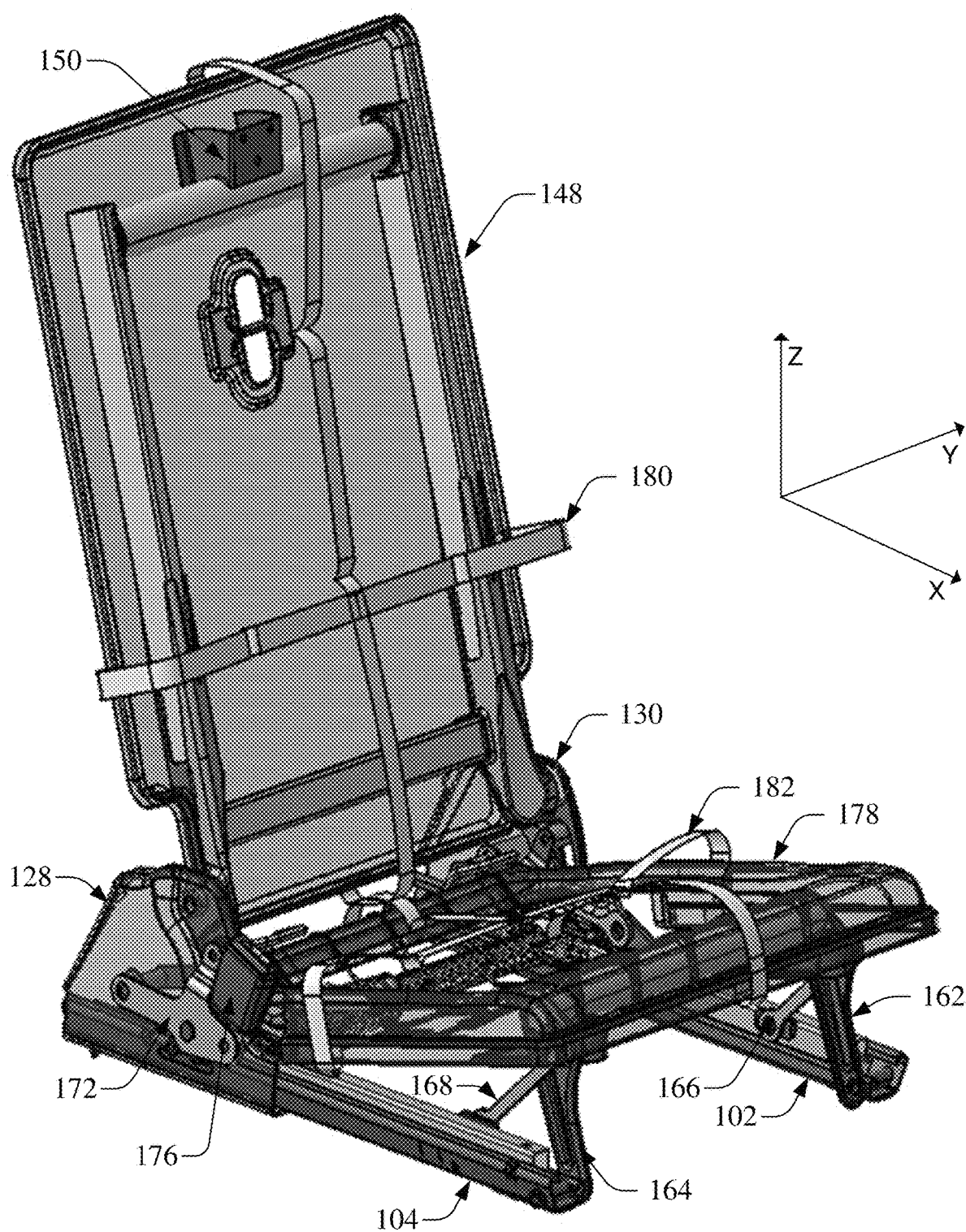
FIG. 10 shows exemplary components of a kinematic vehicle seat in accordance with one or more embodiments described herein.

With reference to FIG. 10, upper seat cushion 180 and lower seat cushion 182 are introduced. It is to be appreciated, however, that upper seat cushion 180 and lower seat cushion 182 are depicted in FIG. 10 as outline, or "skeletons" representative of seat cushions, making the majority of each transparent for illustrative purposes. It is further noted that other figures depict the upper seat cushion 180 and lower seat cushion 182 as entire cushions, and it is to be understood that the outlines/skeletons of FIG. 10 herein can represent the same cushions. The upper seat cushion 180 can be attached to the seat back 148. Similarly, the lower seat cushion 182 can be attached to the seat pan 178. Collectively, the seat pan 178, spring mat, or lower seat cushion 182 can be referred to as a lower seat assembly or a seat bottom.

Figure 11:
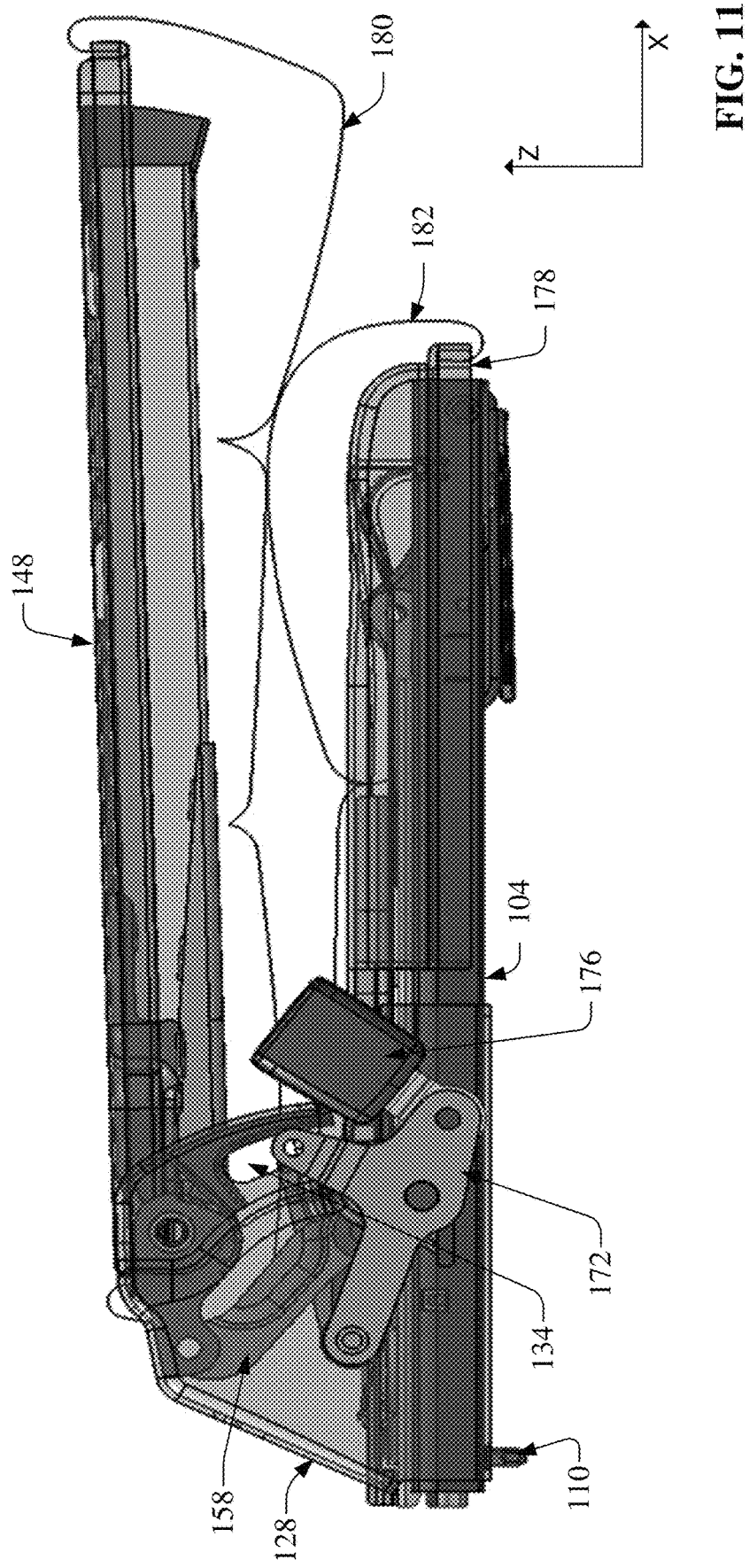
FIG. 11 shows an exemplary kinematic vehicle seat in accordance with one or more embodiments described herein.

Turning now to FIG. 11, there is illustrated a side-view of a vehicle seat 100. In FIG. 11, the upper seat cushion 180 and lower seat cushion 182 are depicted as entire cushions instead of as outlines/skeletons like in FIG. 10. It can be appreciated herein that the upper seat cushion 180 and lower seat cushion 182 do not prevent the seat back 148 from folding into a substantially horizontal position. Further, the upper seat cushion 180 or lower seat cushion 182 can compress as necessary to permit further folding.

Additionally, it can be appreciated in FIG. 11 that the outer lifting arm 172 can be rotatably attached to the side member 128 and is additionally supported or guided by the upper channel 134 or lower channel 138. In this regard, the outer lifting arm 172 can comprise a stud to be received in the lower channel 138 which can provide additional support for the lifting mechanism assembly 173. This slidable engagement between the outer lifting arm 172 and the lower channel 138 can additionally limit or substantially prevent movement along the Y-axis or X-axis in order to provide additional stability of the lifting mechanism assembly 173.

Figure 12:
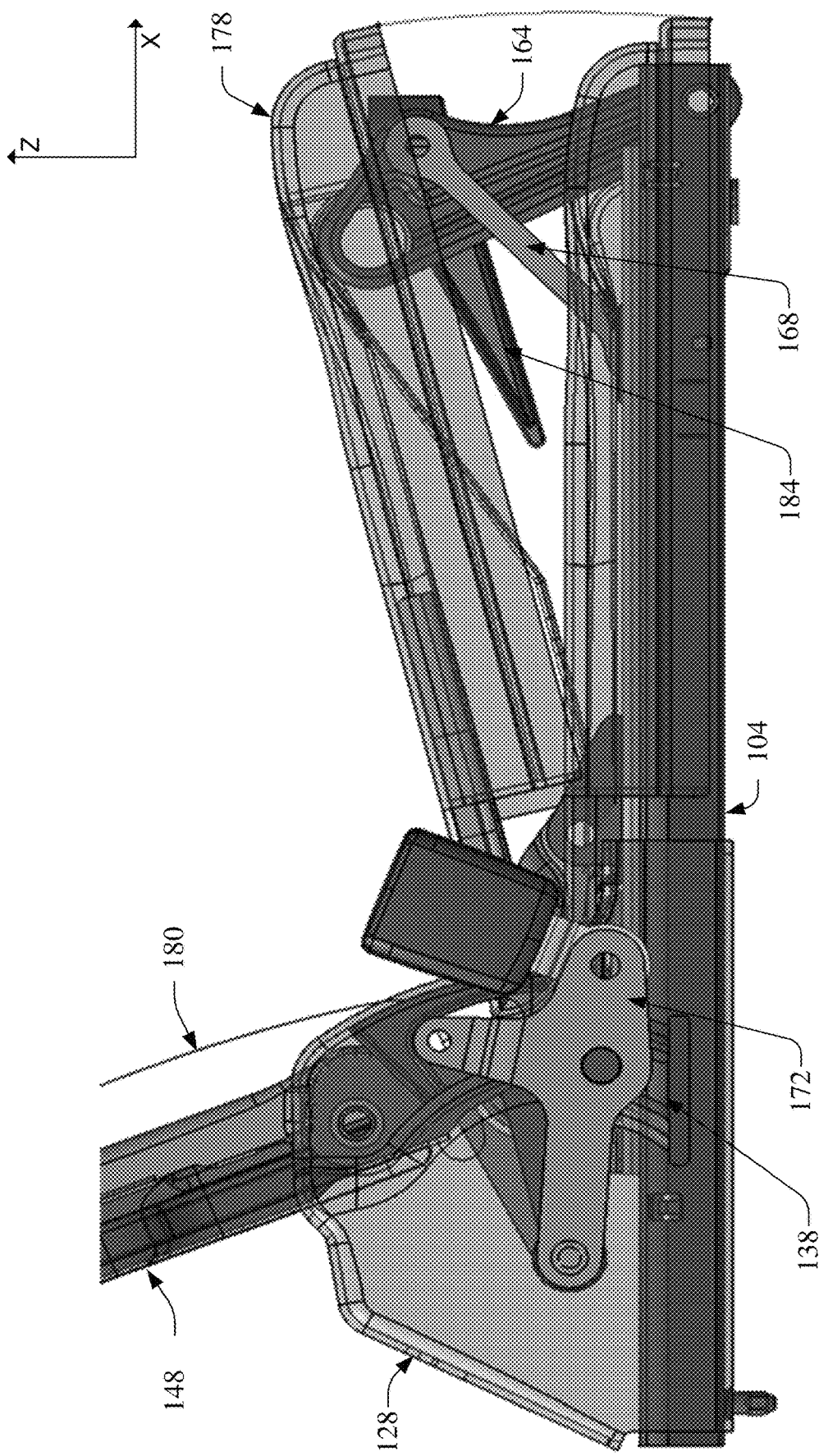
FIG. 12 shows exemplary components of a kinematic vehicle seat in accordance with one or more embodiments described herein.

With reference to FIG. 12, the vehicle seat 100 is depicted in a partially-unfolded position. In FIG. 12, the seat pan clip 184 can be viewed. The seat pan clip 184 (and seat pan clip 186 which will also be later discussed) removably secure the seat pan 178 to the submarine tube 160. Though preferably plastic, the seat pan clips can comprise steel, aluminum, or other suitable materials. Such other materials can comprise various alloys, plastics, etc.

Movement of the lifting mechanism assembly 173 can also be herein appreciated, especially in comparison with FIG. 11. In FIG. 12, the lifting mechanism assembly 173 (outer lifting arm 172 viewable) is in a raised position, as compared to FIG. 11 in which the lifting mechanism assembly 173 is in a lowered position.

Figure 13:
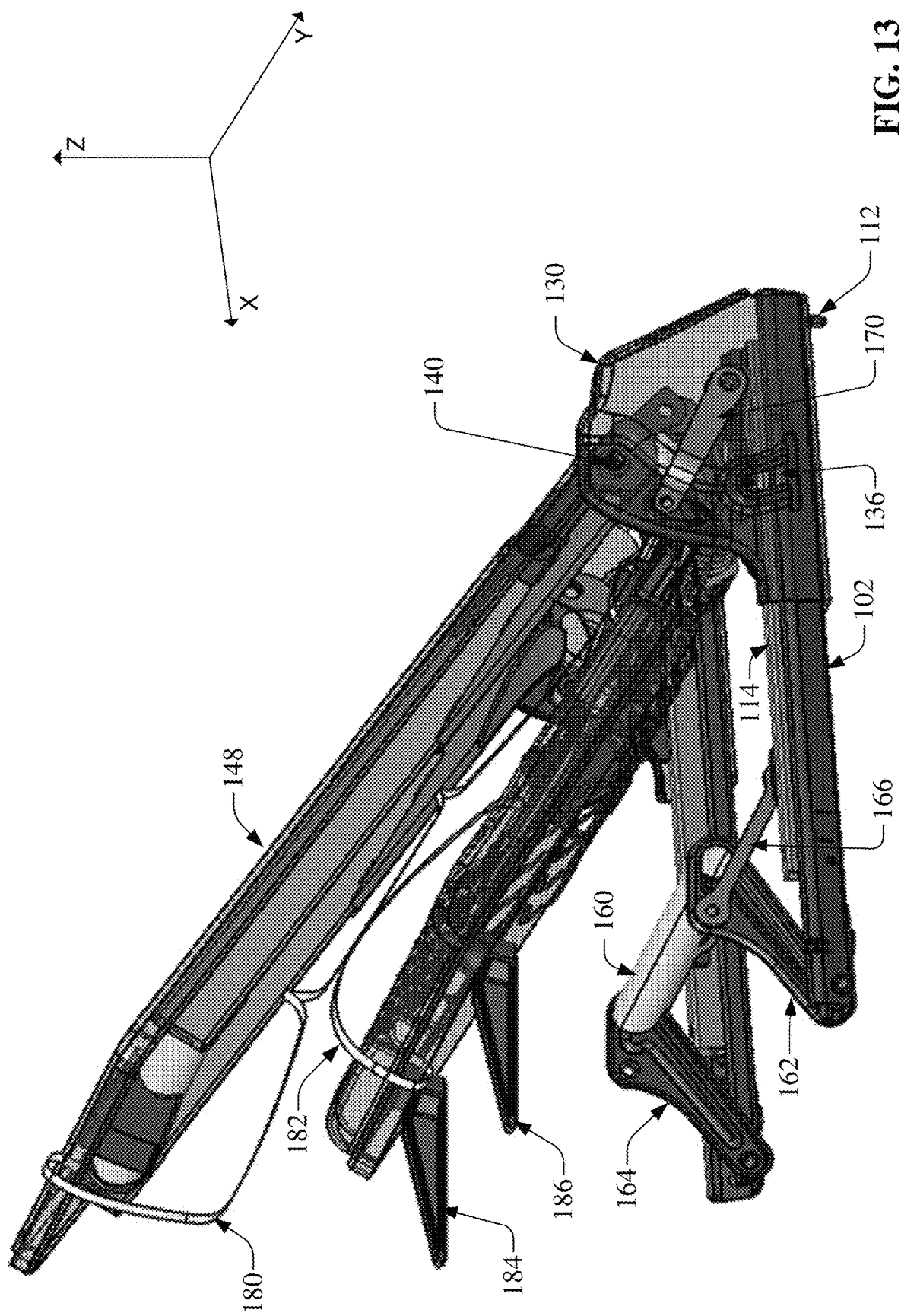
FIG. 13 shows exemplary components of a kinematic vehicle seat in accordance with one or more embodiments described herein.

FIG. 13 illustrates the seat pan clip 184 and seat pan clip 186 (collectively the "seat pan clips") in unlocked positions. When unlocked, the seat pan 178 can be lifted away from the submarine tube 160 while still rotatably attached to the lifting mechanism assembly 173.

Figure 14:
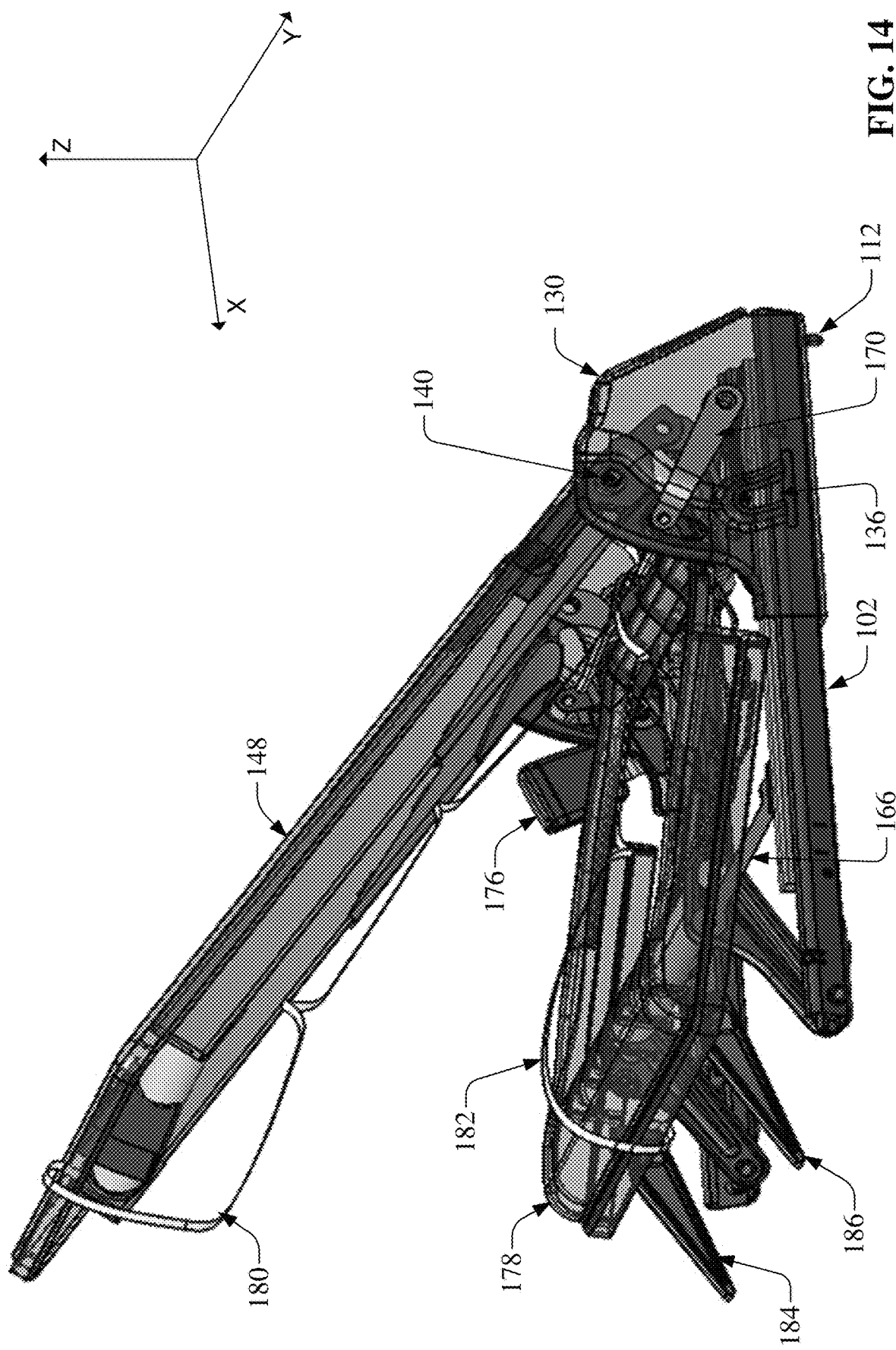
FIG. 14 shows exemplary components of a kinematic vehicle seat in accordance with one or more embodiments described herein.
Figure 15:
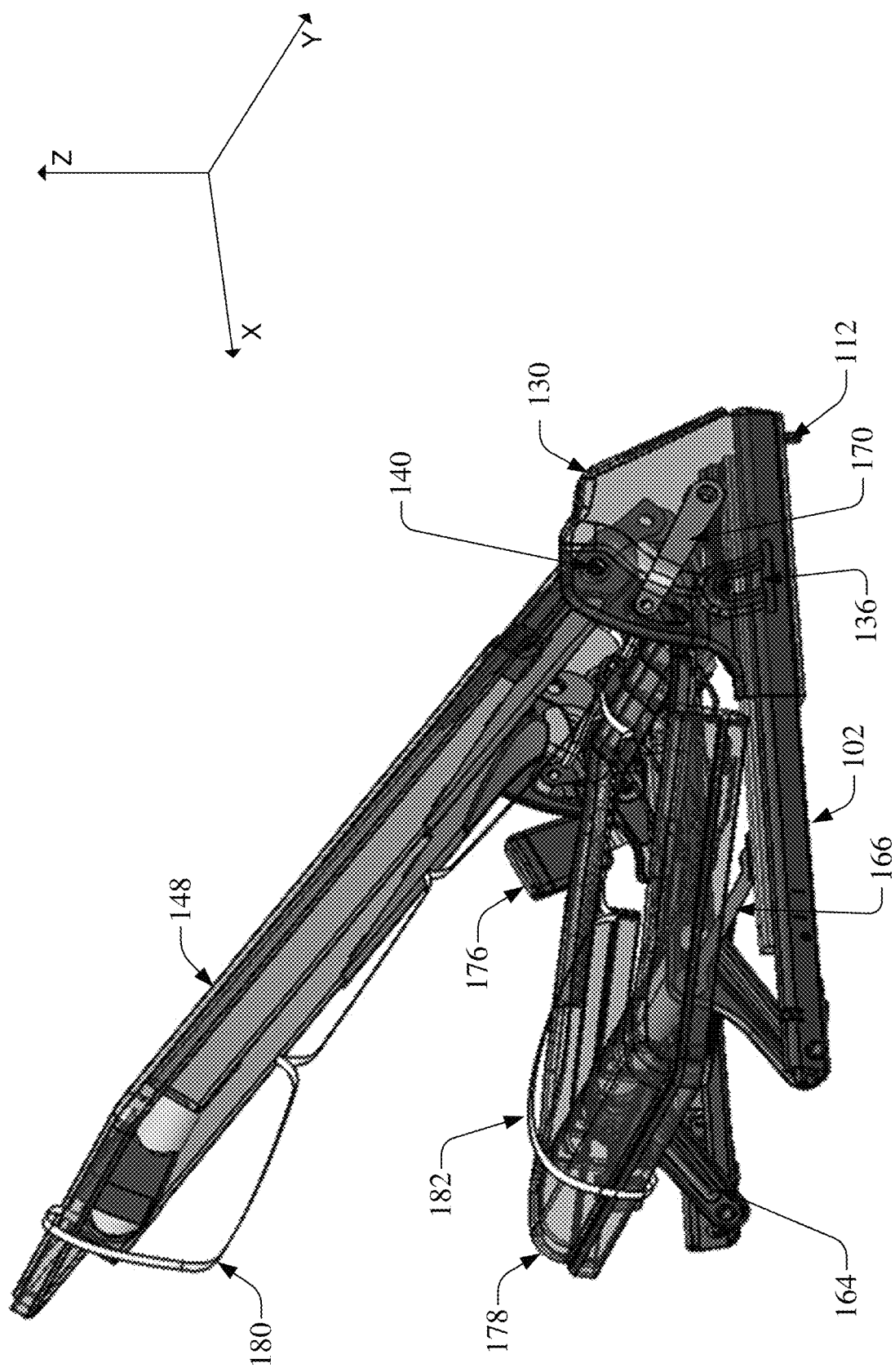
FIG. 15 shows exemplary components of a kinematic vehicle seat in accordance with one or more embodiments described herein.

FIG. 14 illustrates the seat pan 160 lowered onto the submarine tube 160 with the seat pan clips still in unlocked positions. FIG. 15 illustrates the seat pan clips rotated into locked positions. Locking mechanisms, such as a snap lock or other reversibly lockable mechanisms, can be utilized to removably secure the seat pan clip 184 or seat pan clip 186 in a locked position whereby the seat pan 178 is secured to the submarine tube 160. In this regard, when the seat pan clips are locked, movement of the seat pan 178 along the Z-axis, relative to the submarine tube, is restricted. The seat pan clips can still allow for movement of the submarine tube 160 along the X-axis, as the submarine tube 160 rolls or slides against the spring mat and against the seat pan clips. This enables the submarine tube 160 to raise or lower the seat pan 178.

Some embodiments may utilize permanently locked seat pan clips. In this regard, the seat pan clips may not be unlockable once fixed in a locked position against the submarine tube 160.

Figure 16:
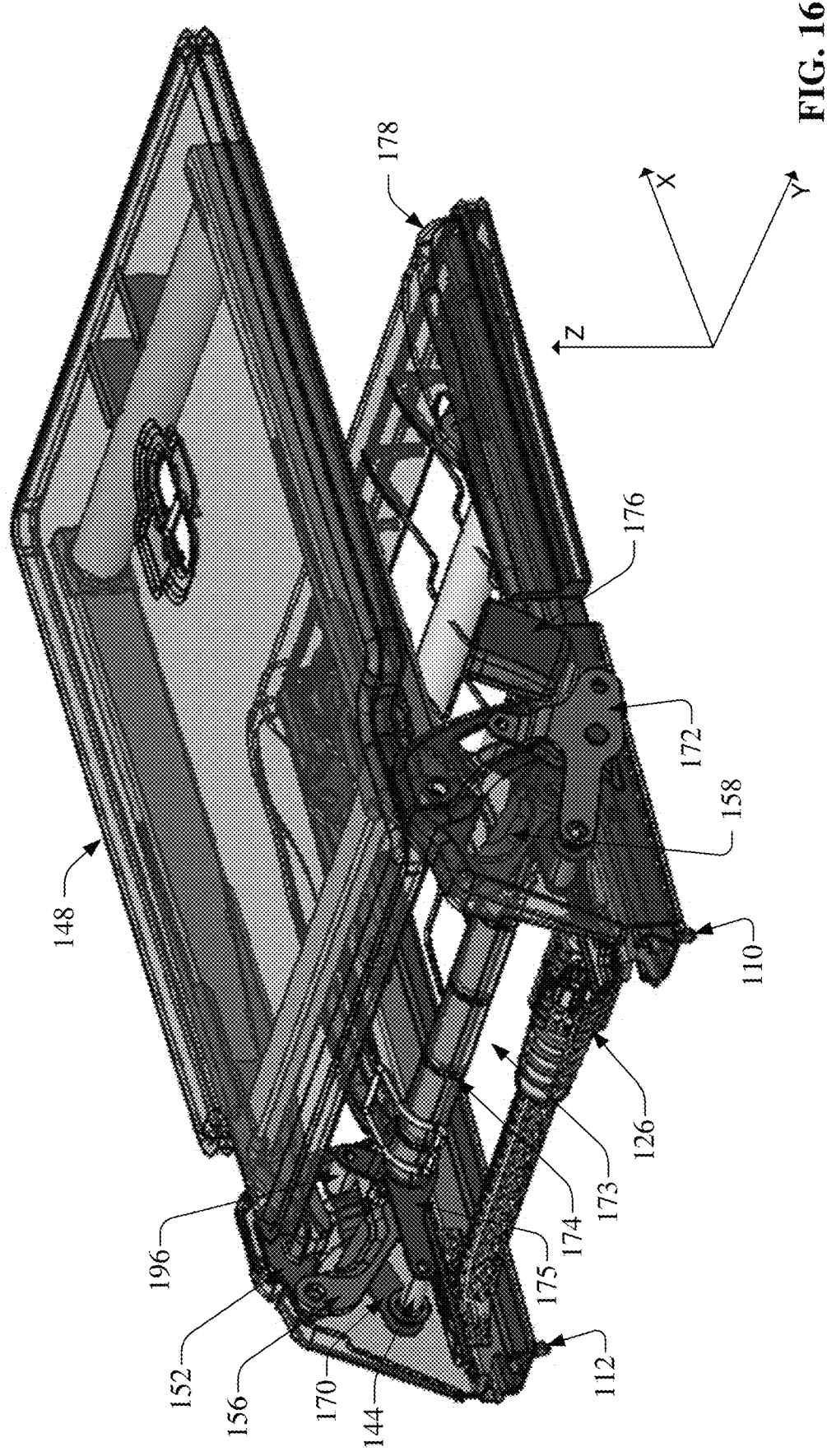
FIG. 16 shows exemplary components of a kinematic vehicle seat in accordance with one or more embodiments described herein.

Turning now to FIG. 16, an alternate view of the vehicle seat 100 is provided. From this vantage point, the lifting mechanism assembly 173 can be appreciated in greater detail. It can be realized that the outer lifting arm 170 is rotatably attached to the side member 130 by the lifting mechanism mount 144. The inner lifting arm 175 is also rotatably attached to the side member 130 by the lifting mechanism mount 144. A lifting connector 196 also attaches the outer lifting arm 170 to the inner lifting arm 175. This lifting connector 196 passes through the upper channel 132. This way, the lifting mechanism assembly 173 can pivot about the lifting mechanism mount 144 while guided and with X-axis movement confined by the upper channel 132. In this regard, the diameter of the lifting connector 196 can be substantially similar to a width of the upper channel 132, such that motion is substantially restricted to only along the arc of the opening of the upper channel 132.

Likewise, the outer lifting arm 172 is rotatably attached to the side member 128 by the lifting mechanism mount 146. The inner lifting arm 177 (later depicted) is also rotatably attached to the side member 128 by lifting mechanism mount 146. A lifting connector 194 also attaches the outer lifting arm 172 to the inner lifting arm 177. The lifting connector 194 passes through the upper channel 134. This way, the lifting mechanism assembly 173 can pivot about the lifting mechanism mount 146 while guided and with X-axis movement confined by the upper channel 134. In this regard, the diameter of the lifting connector 194 can be substantially similar to a width of the upper channel 134, such that motion is substantially restricted to only along the arc of the opening of the upper channel 134.

In FIG. 16 the lifting mechanism 173 is depicted in a lowered position while the vehicle seat 100 is in a folded position. For example, In FIG. 16, the lifting connector 194 and lifting connector 196 are located at the bottoms of the upper channels 134 and 132, respectively.

Additionally, in FIG. 16, the submarine tube 160 is depicted in a lowered position. This way, the seat pan 178 is also lowered into a lowered position, such that the bottom of the seat pan is substantially coplanar with the bottom of the lower rails. This way, in a vehicular application, the bottom of the seat pan 178 could be fully, or at least substantially, lowered to the floor of a vehicle in which the vehicle seat 100 is installed.

Figure 17:
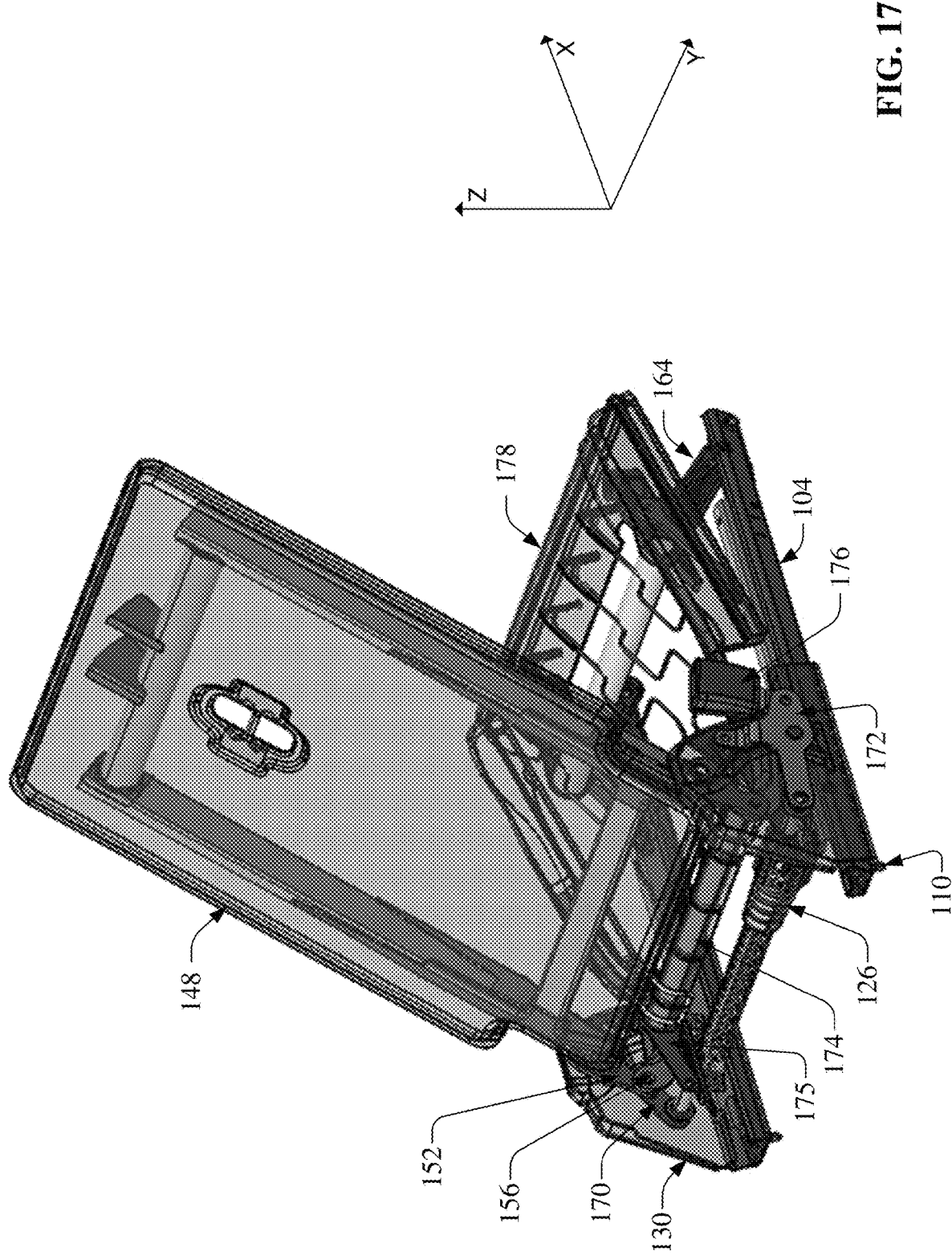
FIG. 17 shows exemplary components of a kinematic vehicle seat in accordance with one or more embodiments described herein.

FIG. 17 illustrates the vehicle seat 100 in a partially folded position. In this figure, it can be appreciated that the submarine tube 160 and lifting mechanism assembly 173 rise, thus lifting the seat pan 178 from a lowered position (as in FIG. 16) while the seat back 148 unfolds into a seating position.

Figure 18:
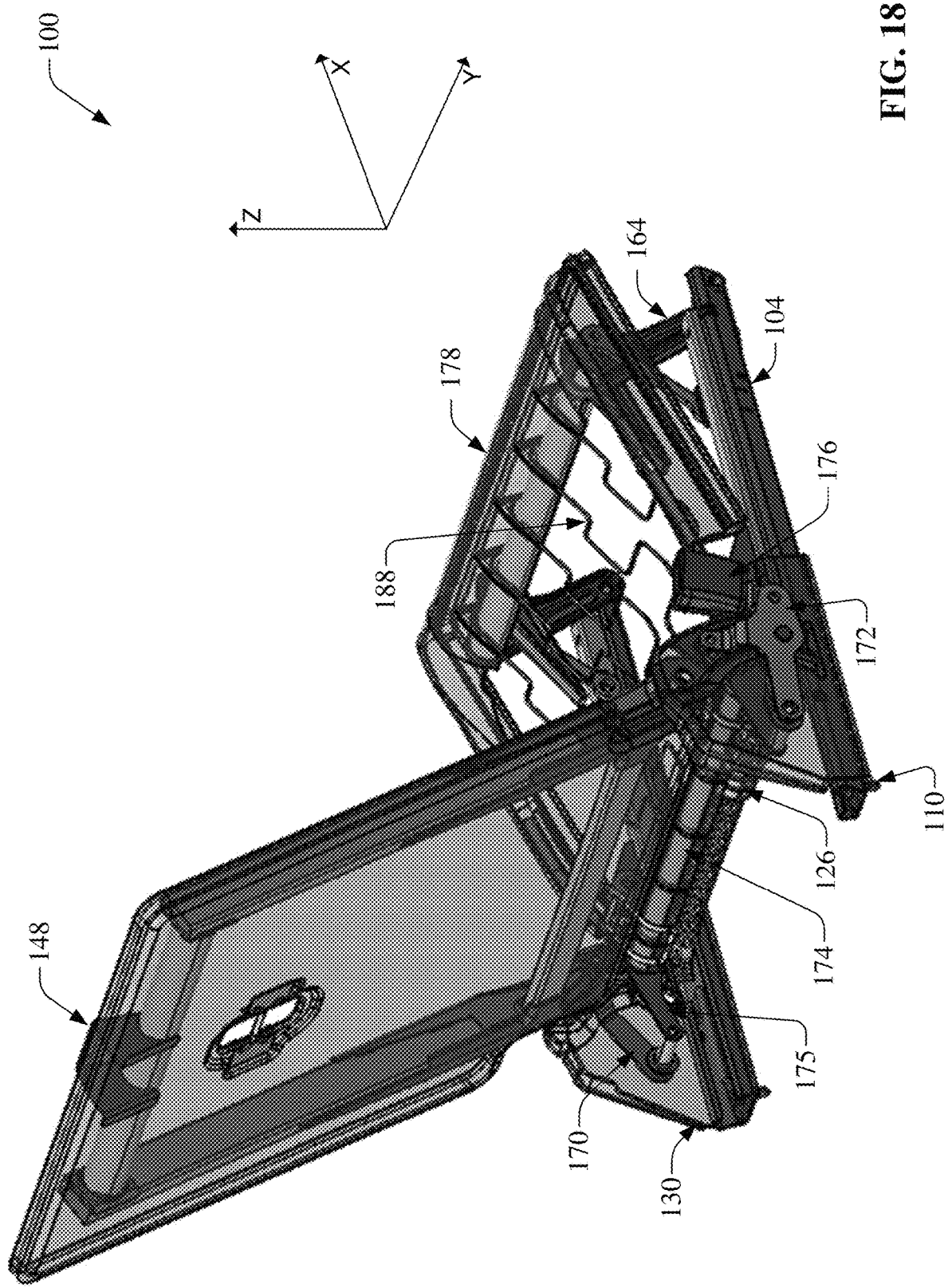
FIG. 18 shows exemplary components of a kinematic vehicle seat in accordance with one or more embodiments described herein.

FIG. 18 illustrates the vehicle seat 100 in a fully unfolded, or seating position. In this regard, the submarine tube 160 and lifting mechanism assembly 173 have reached a maximum height and the seat back 148 rests against recline stop 198 and recline stop 200.

Figure 19:
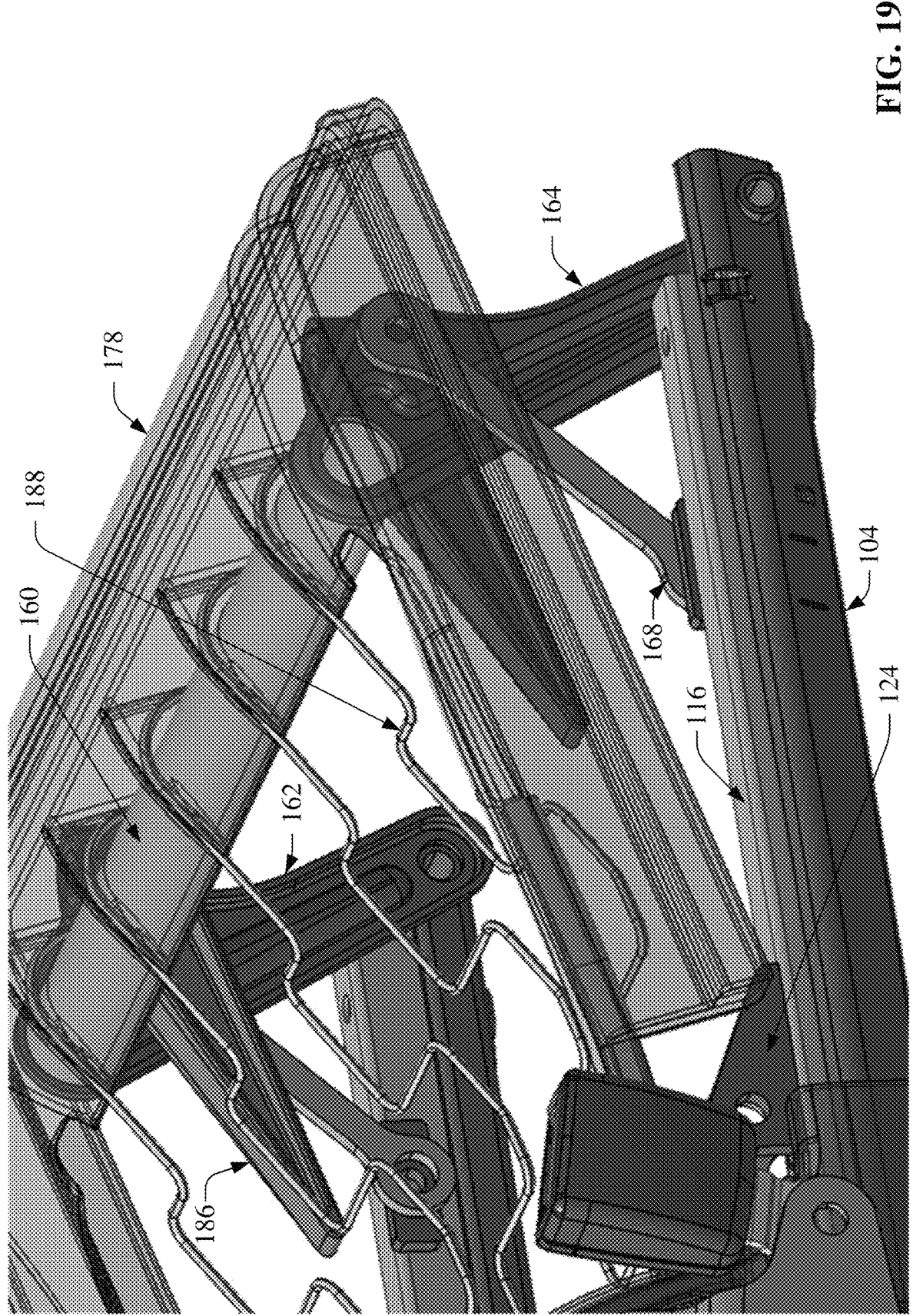
FIG. 19 shows exemplary components of a kinematic vehicle seat in accordance with one or more embodiments described herein.
Figure 20:
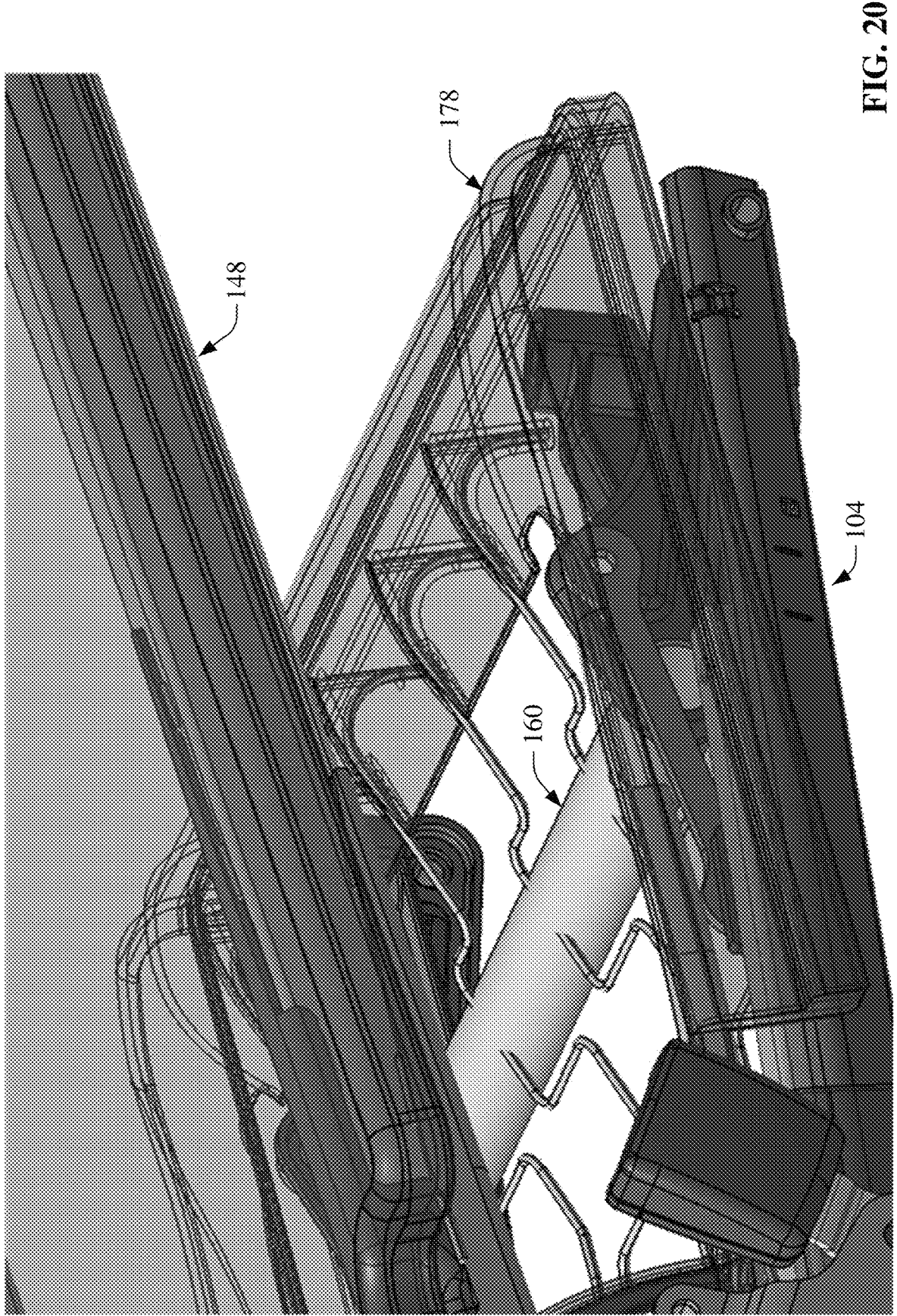
FIG. 20 shows exemplary components of a kinematic vehicle seat in accordance with one or more embodiments described herein.
Figure 21:
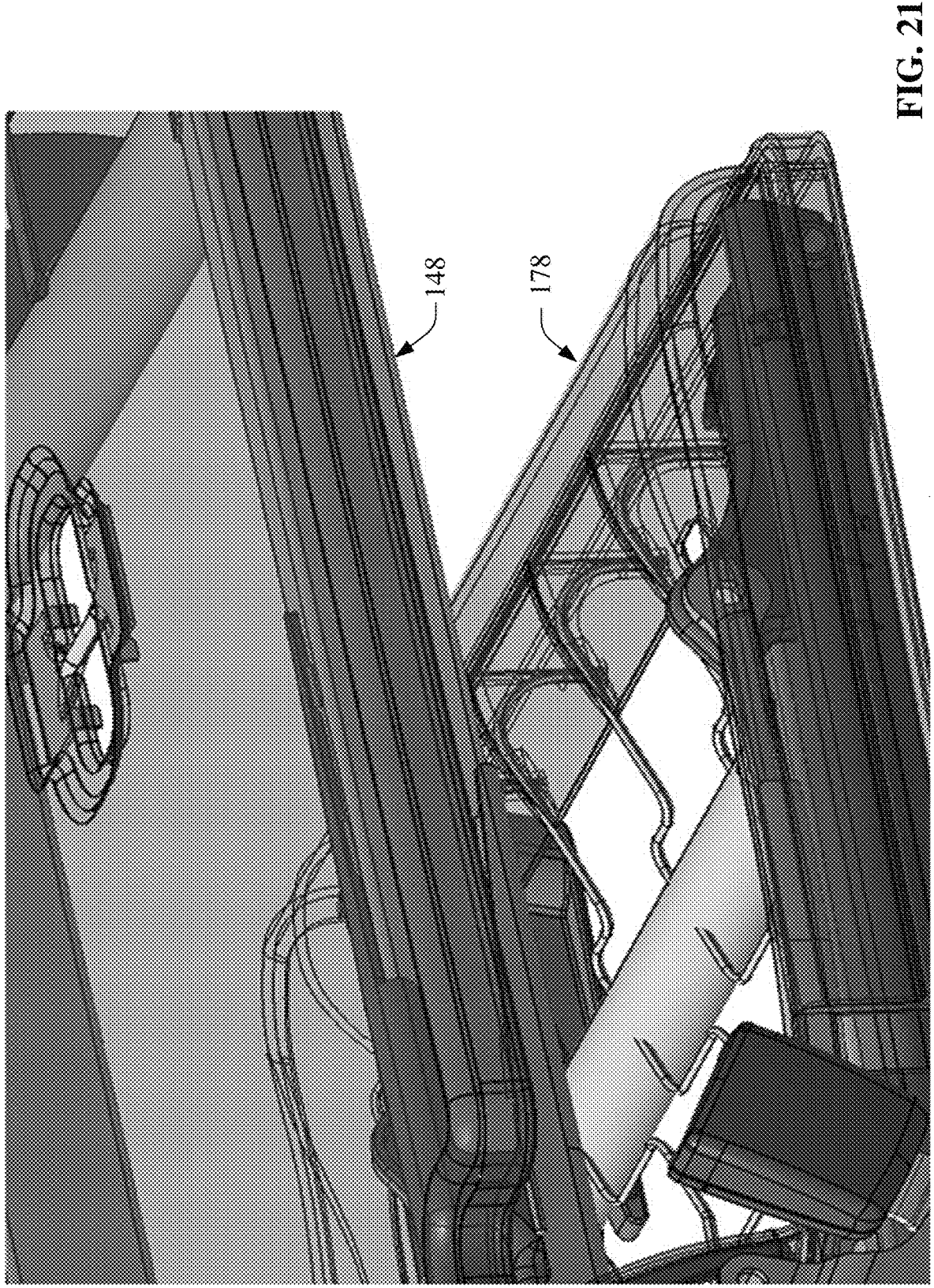
FIG. 21 shows exemplary components of a kinematic vehicle seat in accordance with one or more embodiments described herein.

FIGS. 19-21 are provided with the seat pan 178 depicted as semi-transparent in order to appreciate the kinematic motion of various components of the vehicle seat 100 in various positions. It is noted, however, that the seat pan 178 can substantially or completely cover an entirety of the spring mat.

Figure 22:
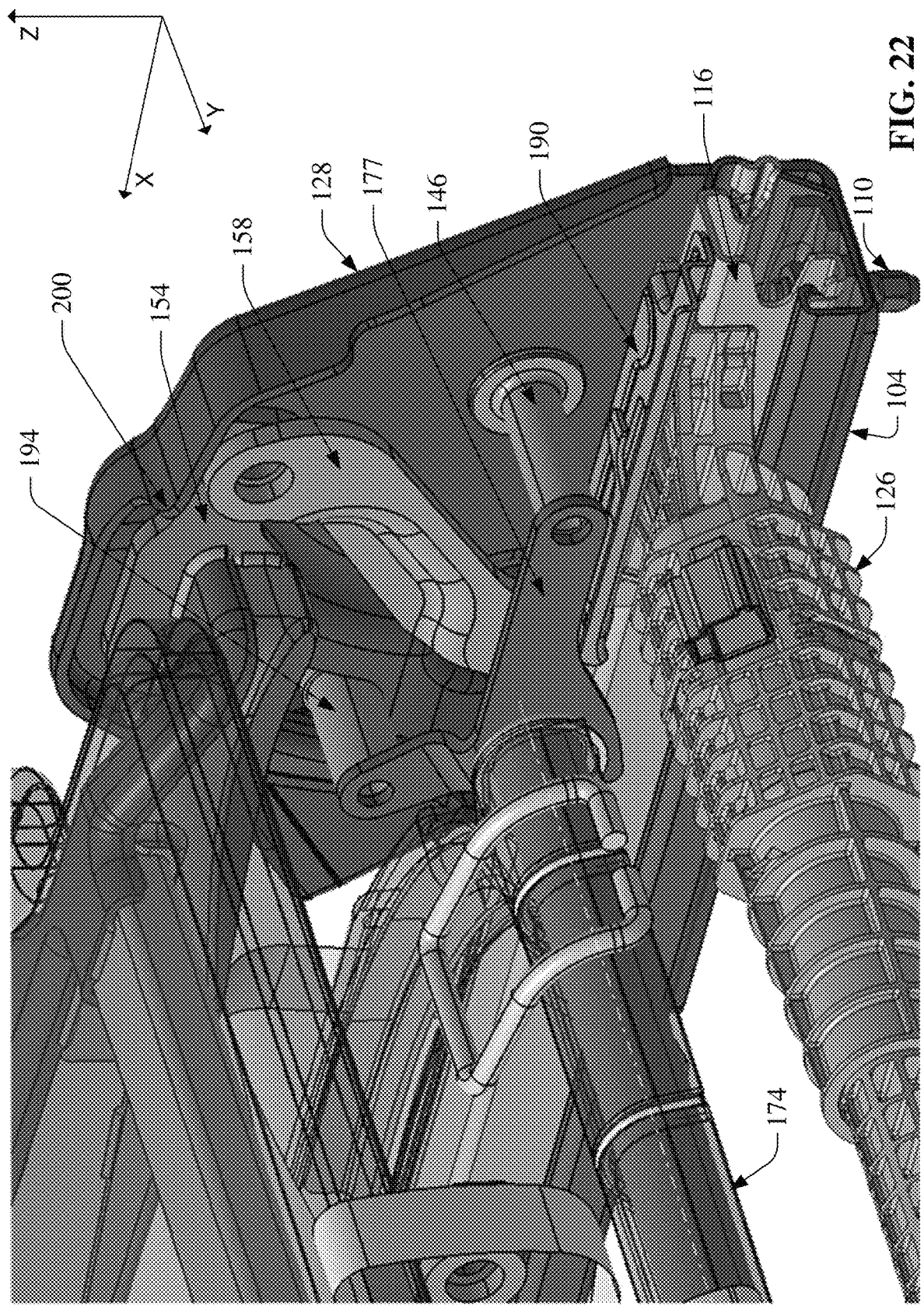
FIG. 22 shows exemplary components of a kinematic vehicle seat in accordance with one or more embodiments described herein.

Turning now to FIG. 22, operation of the lifting mechanism assembly 173 can be more easily appreciated. An upper rail riser 190 is fixed atop the upper rail 116. Likewise, an upper rail riser 191 can be fixed atop the upper rail 114 (e.g., see FIG. 26). The upper rail riser 190 or upper rail riser 191 can comprise steel, aluminum, or other suitable materials. Such other materials can comprise various alloys, plastics, etc.

Figure 23A:
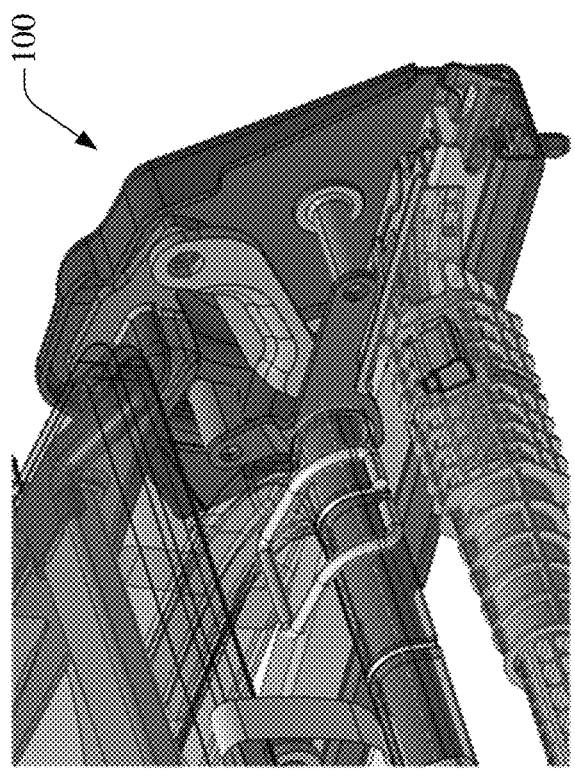
FIGS. 23A-23D show exemplary motion of a partially-assembled kinematic vehicle seat in accordance with one or more embodiments described herein.
Figure 23B:
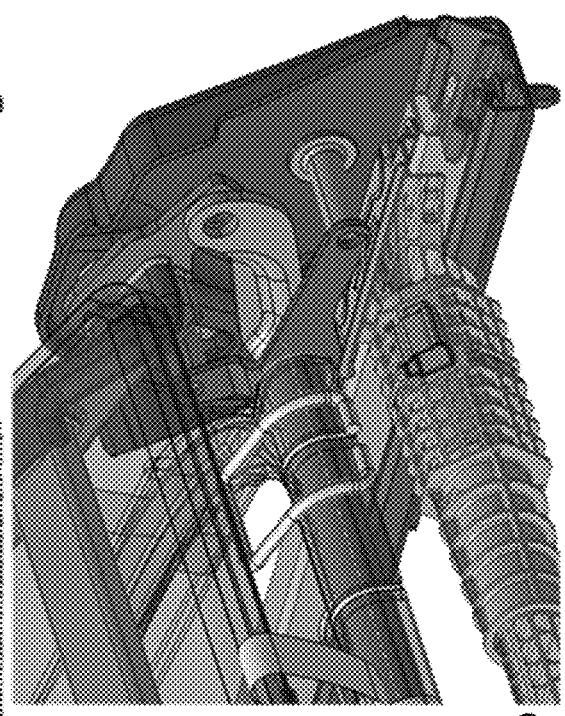
Figure 23C:
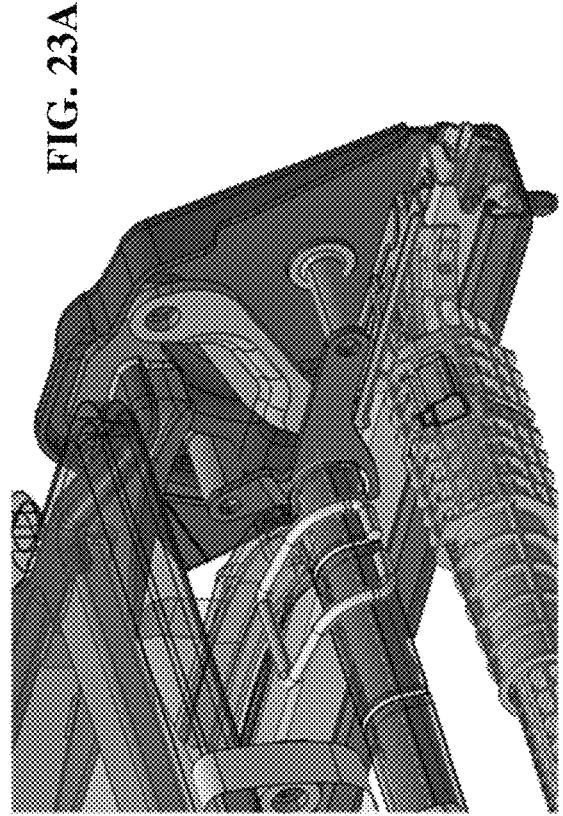
Figure 23D:
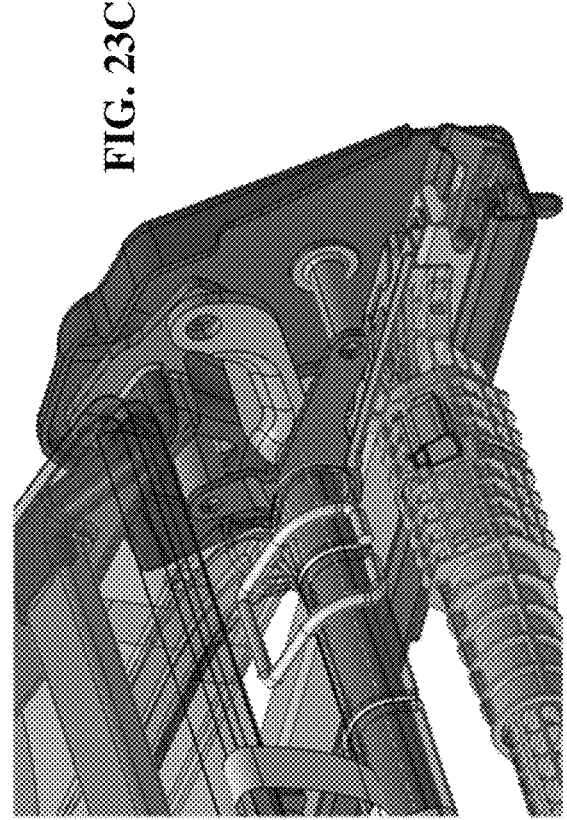
Figure 24A:
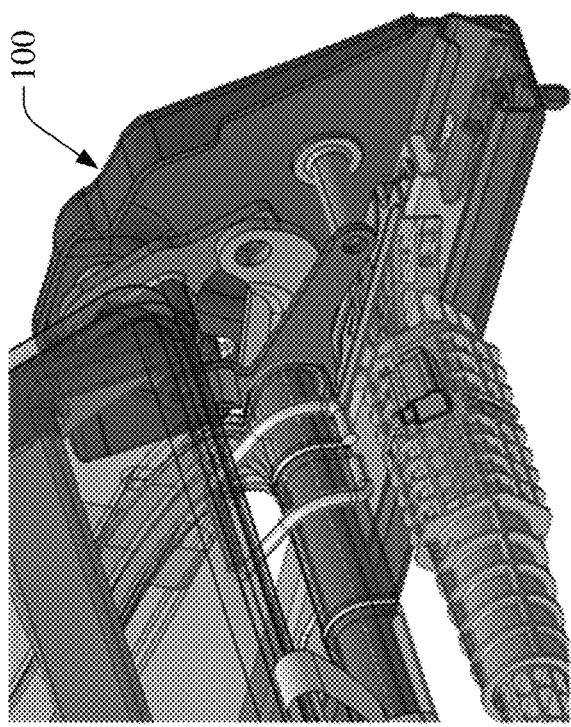
FIGS. 24A-24D show exemplary motion of a partially-assembled kinematic vehicle seat in accordance with one or more embodiments described herein.
Figure 24B:
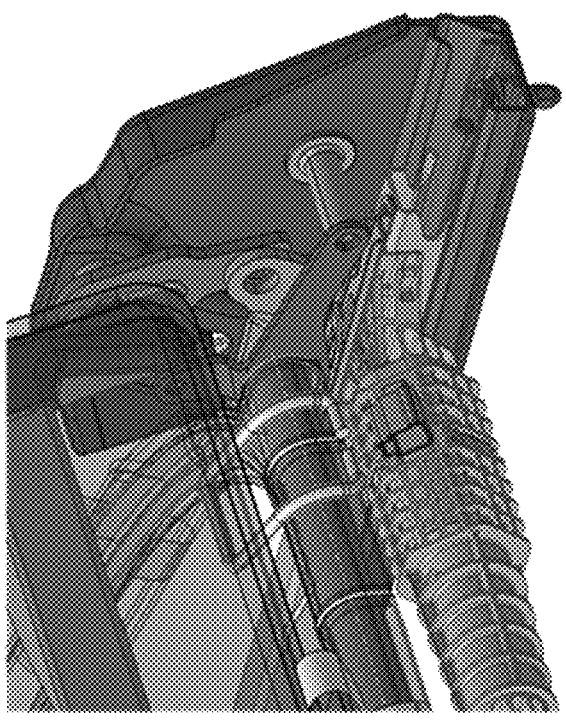
Figure 24C:
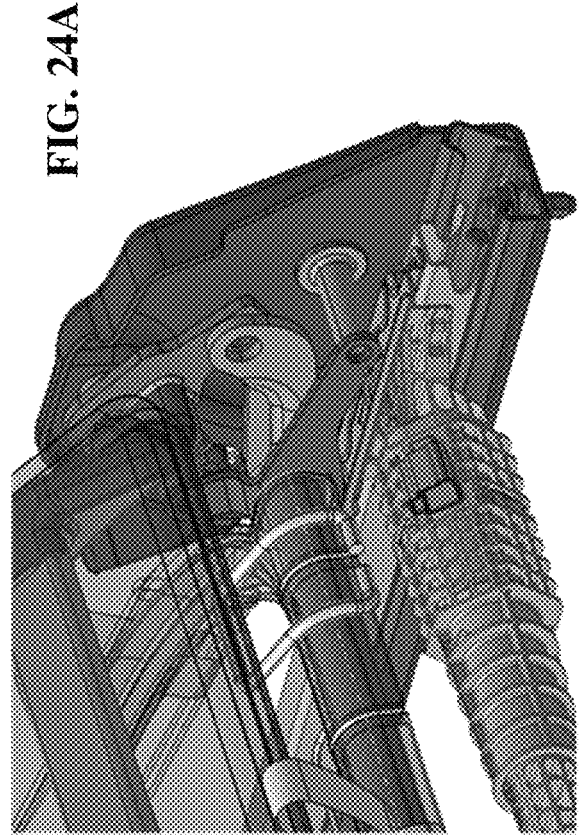
Figure 24D:
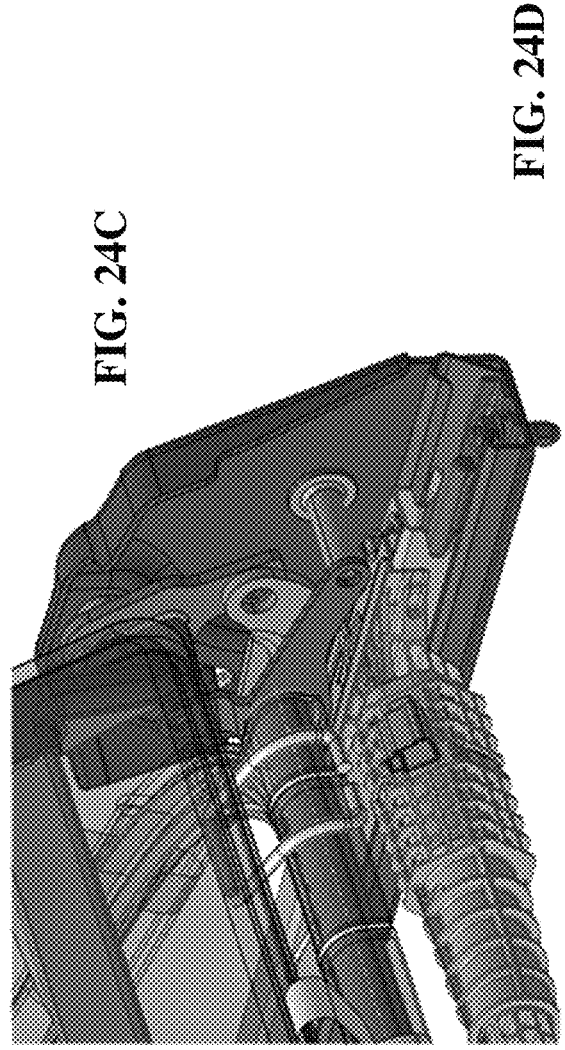
Figure 25:
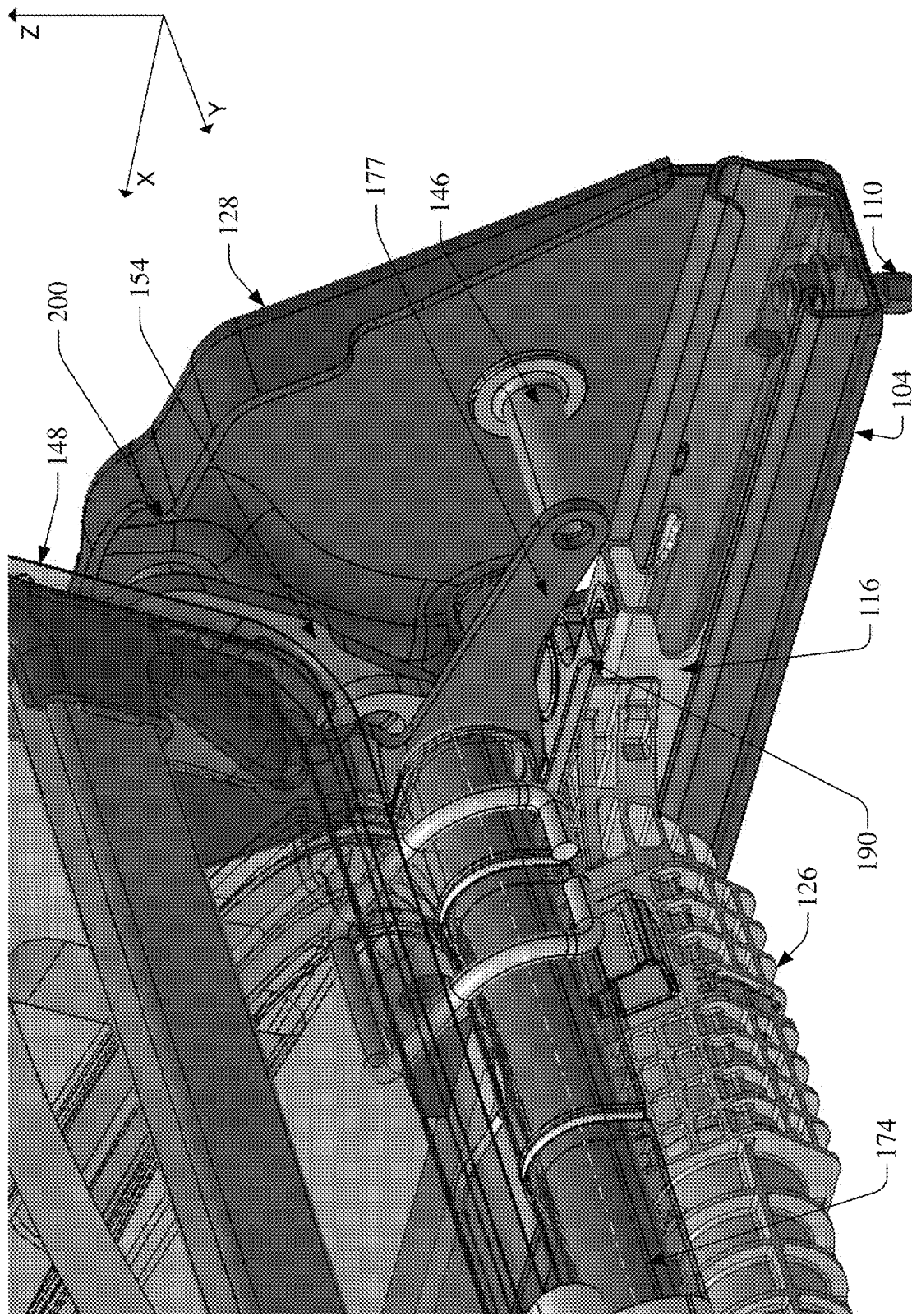
FIG. 25 shows exemplary components of a kinematic vehicle seat in accordance with one or more embodiments described herein.
Figure 26:
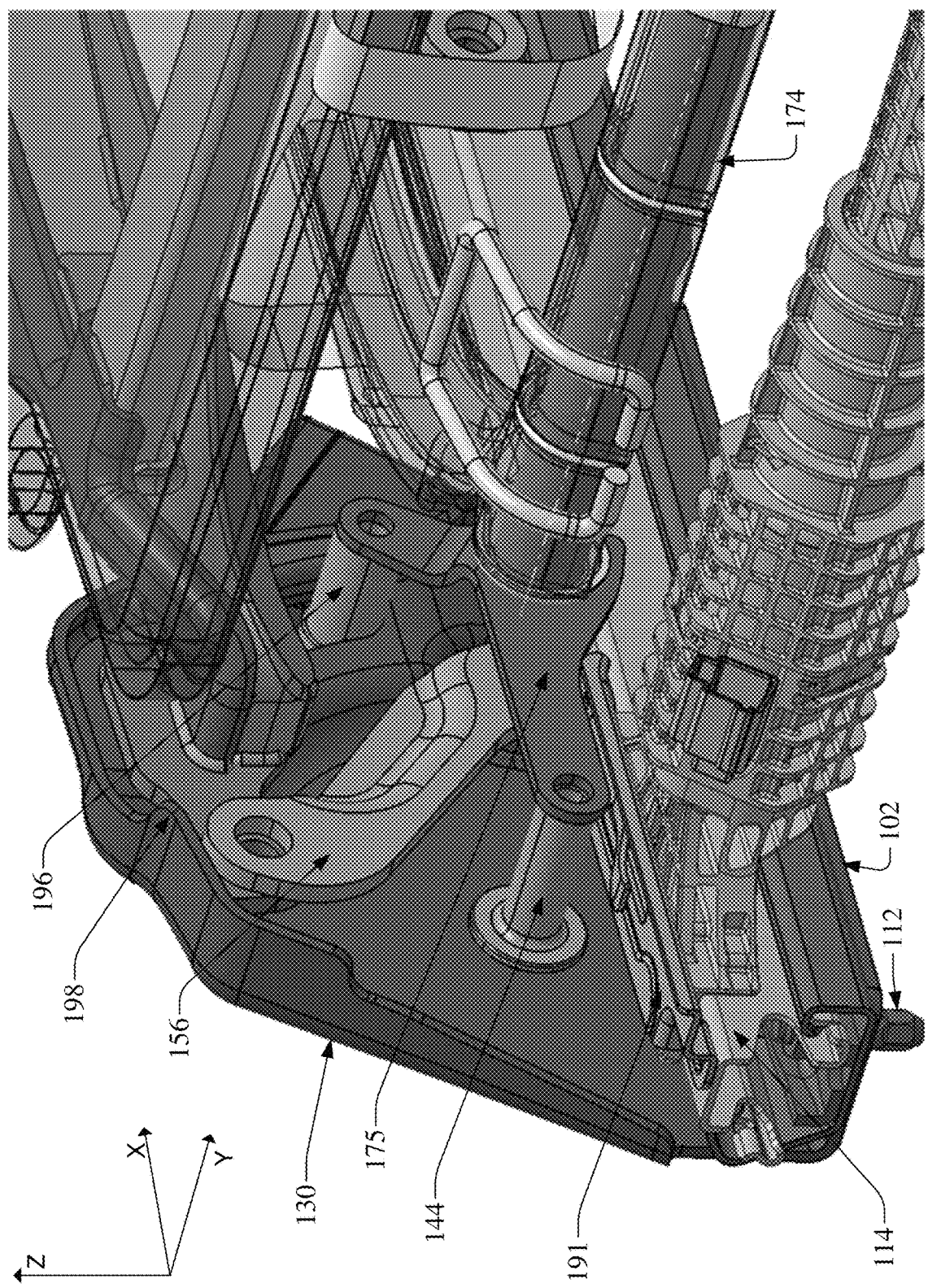
FIG. 26 shows exemplary components of a kinematic vehicle seat in accordance with one or more embodiments described herein.

The upper rail riser 191 is positioned beneath the inner lifting arm 177, such that sliding of the upper rail 116 cause the inner lifting arm 177 to rotate. In this regard, the lifting arm 177 can "ramp up" the upper rail riser 190 to facilitate such motion. This motion can be appreciated in FIG. 23, as the vehicle seat 100 moves from a substantially folded position in FIG. 23A towards partially unfolded in FIG. 23D. This motion is continued in FIG. 24, from FIG. 24A to FIG. 24D. Finally, in FIG. 25, the vehicle seat 100 is nearly in seating position. The inner lifting arm 177 is at a maximum height atop the upper rail riser 190. FIG. 26 provides an alternate view of the lifting mechanism assembly 173.

Turning back to FIG. 22, recline stop 200 can be appreciated. The recline stop 200 can comprise a portion of the side member 128 of which the seat pullback mount 154 or the seat back 148 can contact when the vehicle seat 100 is fully unfolded into a seating position. In this regard, recline stop 200 can provide additional support for the seat back 148 and prevent over-extension of the seat back 148. Other embodiments can comprise a recline stop 200 as a separate component, attached to the side member 128.

Likewise, as can be appreciated in FIG. 26, the recline stop 198 can comprise a portion of the side member 130 on which the seat pullback mount 152 or the seat back 148 can contact when the vehicle seat 100 is fully unfolded into a seating position. In this regard, recline stop 198 can provide additional support for the seat back 148 and can prevent over-extension of the seat back 148.

Figure 27:
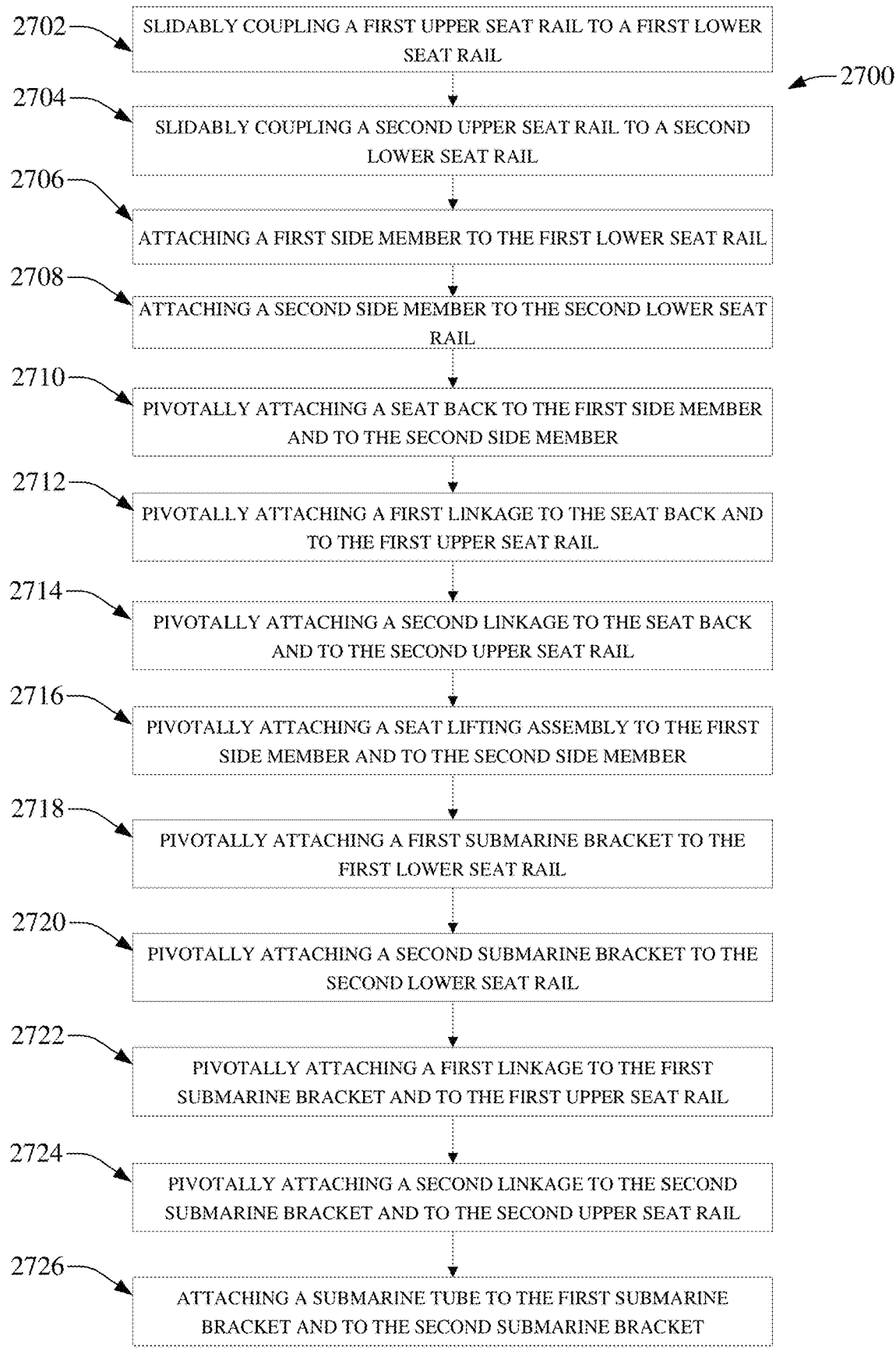
FIG. 27 is a block flow diagram for a process for a method for making a collapsible seat in accordance with one or more embodiments described herein.

With reference to FIG. 27, a method for making a vehicle seat (e.g., vehicle seat 100 is described herein. At 2702, a first upper seat rail (e.g., upper rail 114) is slidably coupled to a first lower seat rail (e.g., lower rail 102). At 2704, a second upper seat rail (e.g., upper rail 116) is slidably coupled to a second lower seat rail (e.g., lower rail 104). At 2706, a first side member (e.g., side member 130) is attached to the first lower seat rail. At 2708, a second side member (e.g., side member 128) is attached to the second lower seat rail. At 2710, a seat back (e.g., seat back 148) is pivotally attached to the first side member and to the second side member. At 2712, a first linkage (e.g., pullback arm 156) is pivotally attached to the seat back and to the first upper seat rail. At 2714, a second linkage (e.g., pullback arm 158) is pivotally attached to the seat back and to the second upper seat rail. At 2716, a seat lifting assembly (e.g., lifting mechanism assembly 173) is pivotally attached to the first side member and to the second side member. At 2718, a first submarine bracket (e.g., submarine bracket 162) is pivotally attached to the first lower seat rail. At 2720, a second submarine bracket (e.g., submarine bracket 164) is pivotally attached to the second lower seat rail. At 2722, a first linkage (e.g., submarine link arm 166) is pivotally attached to the first submarine bracket and to the first upper seat rail. At 2724, a second linkage (e.g., submarine link arm 168) is pivotally attached to the second submarine bracket and to the second upper seat rail. At 2726, a submarine tube (e.g., submarine tube 160) is attached to the first submarine bracket and to the second submarine bracket.

FIG. 27, as described above illustrates respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A kinematic seat for a vehicle comprising:
   a seat base configured to connect to a vehicle;
   a seat back assembly, wherein the seat back assembly is rotatably coupled to a rear lifting assembly of the seat base;
   a lower seat assembly coupled to the rear lifting assembly, and slidably coupled to a submarine tube of a front lifting assembly of the seat base,
   wherein a front portion of the lower seat assembly, via the front lifting assembly, and a rear portion of the lower seat assembly, via the rear lifting assembly, raise concurrently in response to an unfolding of the seat back assembly away from the lower seat assembly, and
   wherein the front portion of the lower seat assembly, via the front lifting assembly, and a rear portion of the lower seat assembly, via the rear lifting assembly, lower concurrently in response to a folding of the seat back assembly towards the lower seat assembly.

2. The kinematic seat of claim 1, wherein a bottom of the lower seat assembly lowers to be substantially parallel to a bottom of the seat base in response to the seat back assembly being fully folded towards the lower seat assembly.

3. The kinematic seat of claim 1, wherein the front portion of the lower seat assembly concurrently raises by a different amount from the rear portion of the lower seat assembly in response to the unfolding of the seat back assembly away from the lower seat assembly.

4. The kinematic seat of claim 1, wherein the front portion of the lower seat assembly concurrently lowers by a different amount from the rear portion of the lower seat assembly in response to the folding of the seat back assembly towards the lower seat assembly.

5. The kinematic seat of claim 1, wherein the submarine tube moves within the lower seat assembly in a direction parallel to an axis from the front portion of the lower seat assembly to the rear portion of the lower seat assembly during a change in a height of the lower seat assembly.

6. The kinematic seat of claim 5, wherein the submarine tube rolls against a spring mat of the lower seat assembly during the movement within the lower seat assembly.

7. The kinematic seat of claim 5, wherein the submarine tube slides against a spring mat of the lower seat assembly during the movement within the lower seat assembly.

8. The kinematic seat of claim 1, wherein the submarine tube is rotatably attached in the front lifting assembly.

9. The kinematic seat of claim 1, wherein the submarine tube is non-rotatably attached in the front lifting assembly.

10. A vehicle seat, comprising:
    a seat base fixed to a vehicle;
    a seat back assembly, wherein the seat back assembly is rotatably coupled to a rear lifting assembly of the seat base;
    a seat pan rotatably coupled to the rear lifting assembly, and coupled to a submarine tube of a front lifting assembly of the seat base,
    wherein a front portion of the seat pan, via the front lifting assembly, and a rear portion of the seat pan, via the rear lifting assembly, raise concurrently with an unfolding of the seat back assembly away from the seat pan,
    wherein the front portion of the seat pan, via the front lifting assembly, and a rear portion of the seat pan, via the rear lifting assembly, lower concurrently in response to a folding of the seat back assembly towards the seat pan, and wherein a bottom of the seat pan lowers to be substantially coplanar with a bottom of a lower rail of the seat base in response to the seat back assembly being fully folded towards the seat pan.

11. The vehicle seat of claim 10, further comprises a lower seat cushion coupled to the seat pan.

12. The vehicle seat of claim 10, wherein the front portion of the seat pan concurrently raises by a different amount from the rear portion of the seat pan with the unfolding of the seat back assembly away from the seat pan.

13. The vehicle seat of claim 10, wherein the front portion of the seat pan concurrently lowers by a different amount from the rear portion of the seat pan with the folding of the seat back assembly towards the seat pan.

14. The vehicle seat of claim 10, wherein the submarine tube moves within the seat pan in a direction parallel to an axis from the front portion of the seat pan to the rear portion of the seat pan during a change in a height of the seat pan.

15. The vehicle seat of claim 10, wherein a height of the submarine tube changes during a change in a height of the seat pan.

16. A method for making a collapsible seat, the method comprising:

rotatably coupling a seat back assembly to a rear lifting assembly of a seat base;

coupling a lower seat assembly to the rear lifting assembly; and slidably coupling the lower seat assembly to a submarine tube of a front lifting assembly of the seat base;

configuring a front portion of the lower seat assembly to concurrently raise, via the front lifting assembly, with a rear portion of the lower seat assembly, via the rear lifting assembly, in response to an unfolding of the seat back assembly away from the lower seat assembly; and configuring the front portion of the lower seat assembly to concurrently lower, via the front lifting assembly, with rear portion of the lower seat assembly, via the rear lifting assembly, in response to a folding of the seat back assembly towards the lower seat assembly.

17. The method of claim 16, further comprising:
configuring the submarine tube to move within the lower seat assembly in a direction parallel to an axis from the front portion of the lower seat assembly to the rear portion of the lower seat assembly during a change in a height of the lower seat assembly.

18. The method of claim 16, further comprising:
configuring the lower seat assembly to lower in response to the seat back assembly being fully folded towards the lower seat assembly, wherein the lowering of the lower seat assembly causes a bottom of the lower seat assembly to be substantially parallel to a bottom of the seat base.

19. The method of claim 16, further comprising:
configuring the front portion of the lower seat assembly to concurrently raise by a different amount from the rear portion of the lower seat assembly in response to the unfolding of the seat back assembly away from the lower seat assembly.

20. The method of claim 16, further comprising:
configuring the front portion of the lower seat assembly to concurrently lower by a different amount from the rear portion of the lower seat assembly in response to the folding of the seat back assembly towards the lower seat assembly.

* * * * *